(12) United States Patent
Edamadaka et al.

(10) Patent No.: US 11,916,856 B2
(45) Date of Patent: Feb. 27, 2024

(54) METHOD AND SYSTEM FOR PROVIDING HIGH EFFICIENCY, BIDIRECTIONAL MESSAGING FOR LOW LATENCY APPLICATIONS

(71) Applicant: JPMorgan Chase Bank, N.A., New York, NY (US)

(72) Inventors: Rajeshwari Edamadaka, Allentown, NJ (US); Diarmuid Leonard, Galway (IE)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/968,157

(22) Filed: Oct. 18, 2022

(65) Prior Publication Data

US 2023/0038335 A1 Feb. 9, 2023

Related U.S. Application Data

(62) Division of application No. 17/089,145, filed on Nov. 4, 2020, now Pat. No. 11,509,611.

(Continued)

(51) Int. Cl.
*H04L 51/046* (2022.01)
*H04L 45/121* (2022.01)
(Continued)

(52) U.S. Cl.
CPC ............ *H04L 51/046* (2013.01); *G06F 7/08* (2013.01); *G06F 8/70* (2013.01); *G06F 9/451* (2018.02); *G06F 9/4881* (2013.01); *G06F 9/505* (2013.01); *G06F 9/5072* (2013.01); *G06F 9/5077* (2013.01); *G06F 9/5083* (2013.01); *G06F 9/542* (2013.01); *G06F 9/546* (2013.01);
(Continued)

(58) Field of Classification Search
CPC ....... H04L 51/046; H04L 67/63; H04L 67/55; H04L 67/562; H04L 67/564; G06F 9/451
See application file for complete search history.

(56) References Cited

U.S. PATENT DOCUMENTS 8,982,882 B2 * 3/2015 Gallant ................. H04L 51/214
370/312
11,178,091 B1 11/2021 Madhavan et al.
(Continued)

*Primary Examiner* — Oleg Survillo
*Assistant Examiner* — Monishwar Mohan
(74) *Attorney, Agent, or Firm* — GREENBLUM & BERNSTEIN, P.L.C.

(57) ABSTRACT

A system and a method for routing a message to an application over a connection oriented session in a Kafka messaging platform environment are provided. The method includes: acquiring a plurality of partitions from the Kafka messaging platform; designating a first partition from among the plurality of partitions as a sticky partition; generating a plurality of routing keys that are configured to route to the sticky partition; receiving a subscription from a service that corresponds to a first application; transmitting, to the first application, a first routing key that identifies the subscription from among the plurality of routing keys; and receiving messages from Kafka services that are routed by the first routing key to the first application. For any particular application or set of applications, a plurality of connection oriented sessions may be used to achieve load balancing and high availability.

18 Claims, 14 Drawing Sheets

Related U.S. Application Data

(60) Provisional application No. 63/036,752, filed on Jun. 9, 2020.

(51) Int. Cl.

| | |
|---|---|
| *G06Q 10/10* | (2023.01) |
| *G06F 11/14* | (2006.01) |
| *G06F 9/48* | (2006.01) |
| *G06Q 30/016* | (2023.01) |
| *G06F 9/54* | (2006.01) |
| *G06F 9/451* | (2018.01) |
| *G06F 8/70* | (2018.01) |
| *G09G 5/377* | (2006.01) |
| *H04M 3/51* | (2006.01) |
| *G06F 9/50* | (2006.01) |
| *G06F 7/08* | (2006.01) |
| *G06F 11/36* | (2006.01) |
| *H04M 3/42* | (2006.01) |
| *H04M 7/00* | (2006.01) |
| *G06Q 10/04* | (2023.01) |
| *G06Q 30/02* | (2023.01) |
| *H04L 9/08* | (2006.01) |
| *H04L 9/32* | (2006.01) |
| *H04L 67/14* | (2022.01) |
| *H04L 67/55* | (2022.01) |
| *H04L 67/63* | (2022.01) |
| *H04L 67/562* | (2022.01) |
| *H04L 67/564* | (2022.01) |
| *H04M 3/436* | (2006.01) |
| *H04M 3/50* | (2006.01) |
| *G06Q 10/20* | (2023.01) |

(52) U.S. Cl.
CPC .......... *G06F 9/547* (2013.01); *G06F 11/1464* (2013.01); *G06F 11/3612* (2013.01); *G06Q 10/04* (2013.01); *G06Q 10/103* (2013.01); *G06Q 30/016* (2013.01); *G06Q 30/0281* (2013.01); *G09G 5/377* (2013.01); *H04L 9/0869* (2013.01); *H04L 9/3242* (2013.01); *H04L 45/121* (2013.01); *H04L 67/14* (2013.01); *H04L 67/55* (2022.05); *H04L 67/562* (2022.05); *H04L 67/564* (2022.05); *H04L 67/63* (2022.05); *H04M 3/42042* (2013.01); *H04M 3/4365* (2013.01); *H04M 3/50* (2013.01); *H04M 3/5183* (2013.01); *H04M 3/5191* (2013.01); *H04M 7/0054* (2013.01); *G06F 2201/805* (2013.01); *G06F 2209/503* (2013.01); *G06F 2209/505* (2013.01); *G06F 2209/508* (2013.01); *G06Q 10/20* (2013.01); *G09G 2354/00* (2013.01)

(56) References Cited

U.S. PATENT DOCUMENTS

| | | | |
|---|---|---|---|
| 2013/0007505 A1* | 1/2013 | Spear | G06F 11/2025 714/4.11 |
| 2017/0277753 A1* | 9/2017 | Kekre | H04L 65/765 |
| 2017/0289084 A1* | 10/2017 | Davison | H04L 65/1069 |
| 2019/0208011 A1* | 7/2019 | Dutta | G06F 11/1464 |
| 2020/0125572 A1* | 4/2020 | Hanckel | G06F 16/248 |
| 2020/0396306 A1* | 12/2020 | Jaltade | G06F 9/5077 |

\* cited by examiner

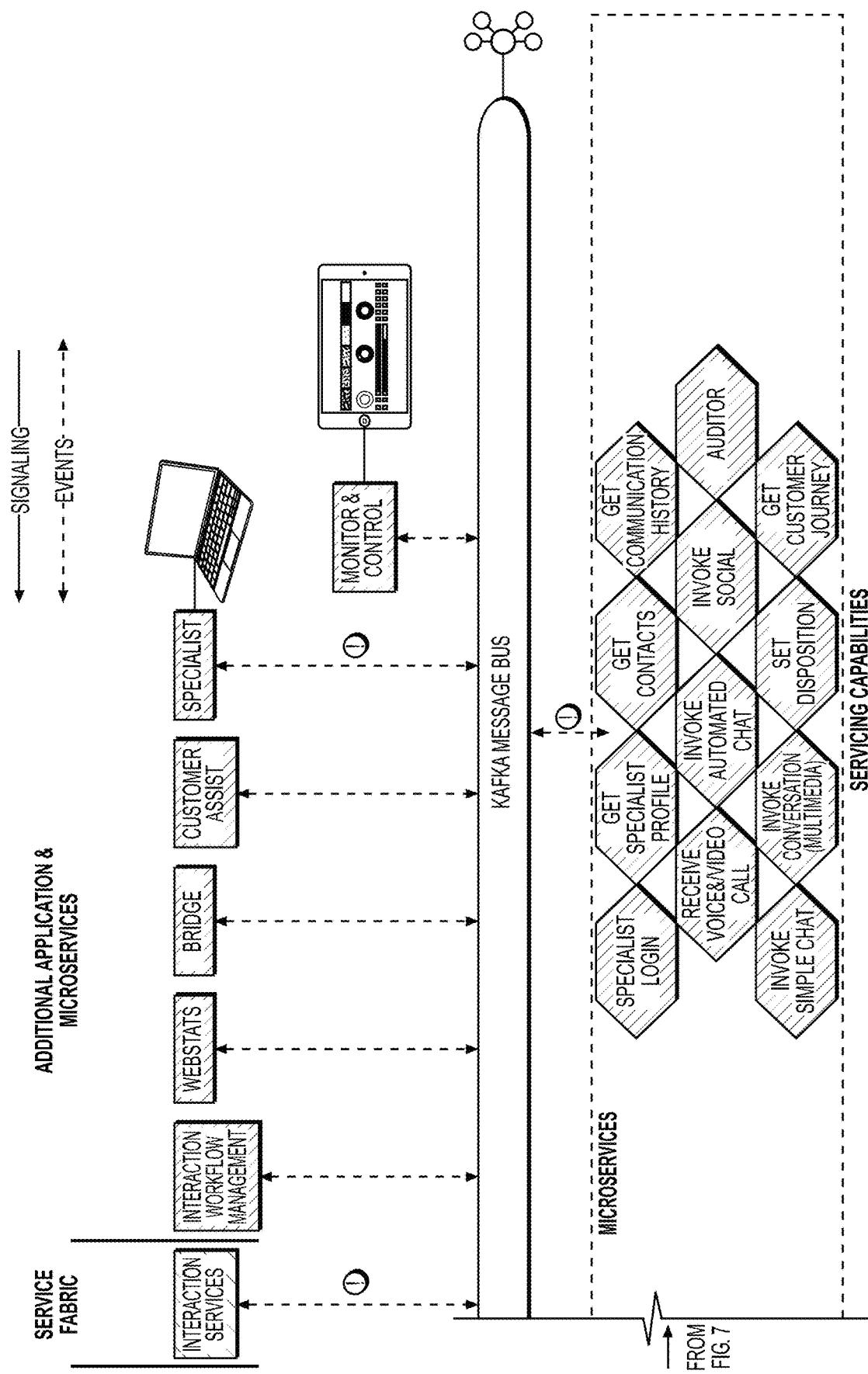

METHOD AND SYSTEM FOR PROVIDING HIGH EFFICIENCY, BIDIRECTIONAL MESSAGING FOR LOW LATENCY APPLICATIONS

CROSS-REFERENCE TO RELATED APPLICATIONS

This application is a divisional of U.S. application Ser. No. 17/089,145, filed Nov. 4, 2020, which claims the benefit of U.S. Provisional Patent Application Ser. No. 63/036,752, filed Jun. 9, 2020, each of which is hereby incorporated by reference in its respective entirety.

BACKGROUND

1. Field of the Disclosure

This technology generally relates to methods and systems for performing customer service interactions, and more particularly to methods and systems for integrating and streamlining large number of customer service interactions to ensure efficient and accurate interaction servicing results.

2. Background Information

For a large corporate organization that has many customers, customer service is an important aspect of the business operation. Customers typically expect service requests to be handled in a timely and accurate manner, and if the corporate organization fails to provide such customer service, there may be a negative effect on the reputation of that organization.

Many customer service requests are performed online via the Internet. For such requests, it is important that the request be assessed and routed to the correct entity within the corporate organization, together with all of the relevant information that will be needed by the entity that will handle the request. However, the proper routing and handling of such requests may be complicated when the number of requests is large and the size of the corporate organization is large.

Accordingly, there is a need for a tool that integrates and streamlines the processing of customer service interactions in order to ensure efficient and accurate handling and resolution thereof.

SUMMARY

The present disclosure, through one or more of its various aspects, embodiments, and/or specific features or sub-components, provides, inter alia, various systems, servers, devices, methods, media, programs, and platforms for handling large number of customer service interactions to ensure efficient and accurate interaction servicing results.

According to an aspect of the present disclosure, a method for servicing a plurality of interactions with users is provided. The method is implemented by at least one processor. The method includes: receiving, by the at least one processor from each respective user, a respective request for a corresponding interaction; obtaining, by the at least one processor for each interaction, request-specific information that relates to the received respective request and user-specific information that relates to the respective user; analyzing, by the at least one processor for each interaction, the request-specific information to determine at least one corresponding microservice that is usable for handling the interaction; and routing, by the at least one processor for each interaction, the request-specific information and the user-specific information to a respective destination that relates to the determined at least one corresponding microservice.

The method may further include receiving, by the at least one processor from the at least one corresponding microservice, response information that relates to a response to the respective request for the corresponding interaction.

The method may further include displaying, by the at least one processor for at least one interaction, a screen that includes at least a subset of the request-specific information, at least a subset of the user-specific information, and status information that relates to a status of the response to the respective request for the at least one interaction.

The method may further include determining, for each interaction, a request type for each respective request, the request type including at least one from among a voice request, an email request, an online chat request, a browser request, and a click-to-call request.

The analyzing may further include analyzing the request-specific information to determine at least two corresponding microservices that are usable for handling the corresponding interaction.

The method may further include determining at least two separate routes having at least two different destinations that correspond to the determined at least two corresponding microservices; and using at least one metric that relates to a workload distribution to select an optimum route from among the determined at least two separate routes. The routing may further include using the selected optimum route.

According to another exemplary embodiment, a method for routing a message to an application in a Kafka messaging platform environment is provided. The method is implemented by at least one processor. The method includes: acquiring, by the at least one processor, a plurality of partitions from the Kafka messaging platform; designating, by the at least one processor, a first partition from among the plurality of partitions as a sticky partition; generating, by the at least one processor, a plurality of routing keys that are configured to route to the sticky partition; using, by the at least one processor, a first routing key from among the plurality of routing keys for a first service subscription; processing, by the at least one processor, a first application subscription from a first connection oriented session from a first application, and returning the first routing key as a first subscription identifier; removing by the at least one processor, the first routing key from plurality of routing keys for a subsequent client subscription; and receiving, by the at least one processor, a message transmitted by a second service using the first subscription identifier as a routing key.

The method may further include: using a custom Kafka sticky partition assignor to acquire a first plurality of metadata that relates to a sticky partition priority; and determining, for each of the first plurality of metadata, a respective highest priority partition for which a corresponding assignment does not change.

The generating of the plurality of routing keys may include generating a plurality of random keys; applying a Kafka hash-plus-modulo algorithm to the random keys; and retaining the keys that map to the sticky partition.

The generating of the plurality of routing keys may include generating a plurality of random keys; producing the random keys to an inbound topic; and when the keys are consumed, storing keys that are from the sticky partition.

The method may further include: associating, by the at least one processor, a first data center identification with a Kafka messaging platform cluster identification and a topic identification; caching, by the at least one processor, the first data center identification with the first subscription identifier; determining the first data center identification when an event is received; and routing the event by using the first subscription identifier and the first data center identification to select a target Kafka cluster based on the associated Kafka messaging platform cluster identification and the associated topic identification.

The method may further include: receiving, by the at least one processor, a first event from among a plurality of event, with a time duration for which the first event is valid; determining that the time duration for which the first event is valid has been exceeded; and dropping the first event.

According to yet another exemplary embodiment, a method for load-balancing a delivery of messages over a plurality of connection oriented sessions from a plurality of applications is provided. The method is implemented by at least one processor in a Kafka messaging platform environment. The method includes: obtaining, by the at least one processor, a first subscription from a first application containing a first load balancing group identification; assigning, by the at least one processor, a first subscription identification to the first subscription; caching, by the at least one processor, a mapping of the first load balancing group identification to a list of subscription identifications and a mapping of the first subscription identification to a connection oriented session; transmitting, to the first application by the at least one processor, a subscribe response that includes the first subscription identification; receiving, by the at least one processor, a notification event that includes the first subscription identification; and attempting, by the at least one processor, to deliver a message to the first application when the cached first subscription identification maps to a connection oriented session of the first application.

The notification event may be received from an event provider that has received the notification event and randomly selected the first subscription identification from the list of subscription identifications.

The method may further include: when the attempting to deliver the message fails when using a first connection oriented session that corresponds to the first subscription identification, using the list of subscription identifications to identify a second connection oriented session that relates to a second application for which a corresponding subscription identification has a matching load balancing group identification as the first connection oriented session; and attempting to deliver the message to the second application.

The method may further include: evaluating, by the at least one processor, a total number of subscription identifications for a first availability zone from among a plurality of availability zones and for the first load balancing group identification from among a plurality of load balancing group identifications; and triggering, by the at least one processor, a redistribution of connection oriented sessions with the first application.

According to still another exemplary embodiment, a method for ensuring a delivery of a message in a Kafka messaging platform environment despite a network connection failure is provided. The method is implemented by at least one processor. The method includes: obtaining, by the at least one processor from a first application, a first subscription containing a first high availability group identification; assigning, by the at least one processor, a first subscription identification to the first subscription; caching, by the at least one processor, a mapping of the first high availability group identification to an ordered list of subscription identifications; transmitting, to the first application by the at least one processor, a subscribe response that includes the first subscription identification; receiving, by the at least one processor, a notification event that includes the first subscription identification; and attempting, by the at least one processor, to deliver a message to the first application when the first subscription identification matches a connection oriented session subscription of the first application.

The notification event may be received from an event provider that selected the first subscription identification from the ordered list of subscription identifications based on the first subscription identification being listed first in an order of the ordered list.

The method may further include: when the attempting to deliver the message fails, determining, from the ordered list of subscription identifications, at least one subscription identification for which a high availability group identification matches the first high availability group identification of the first subscription, and identifying a second subscription identification that matches a second connection oriented session of the first application; and attempting to deliver the message to the first application using the second connection oriented session.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
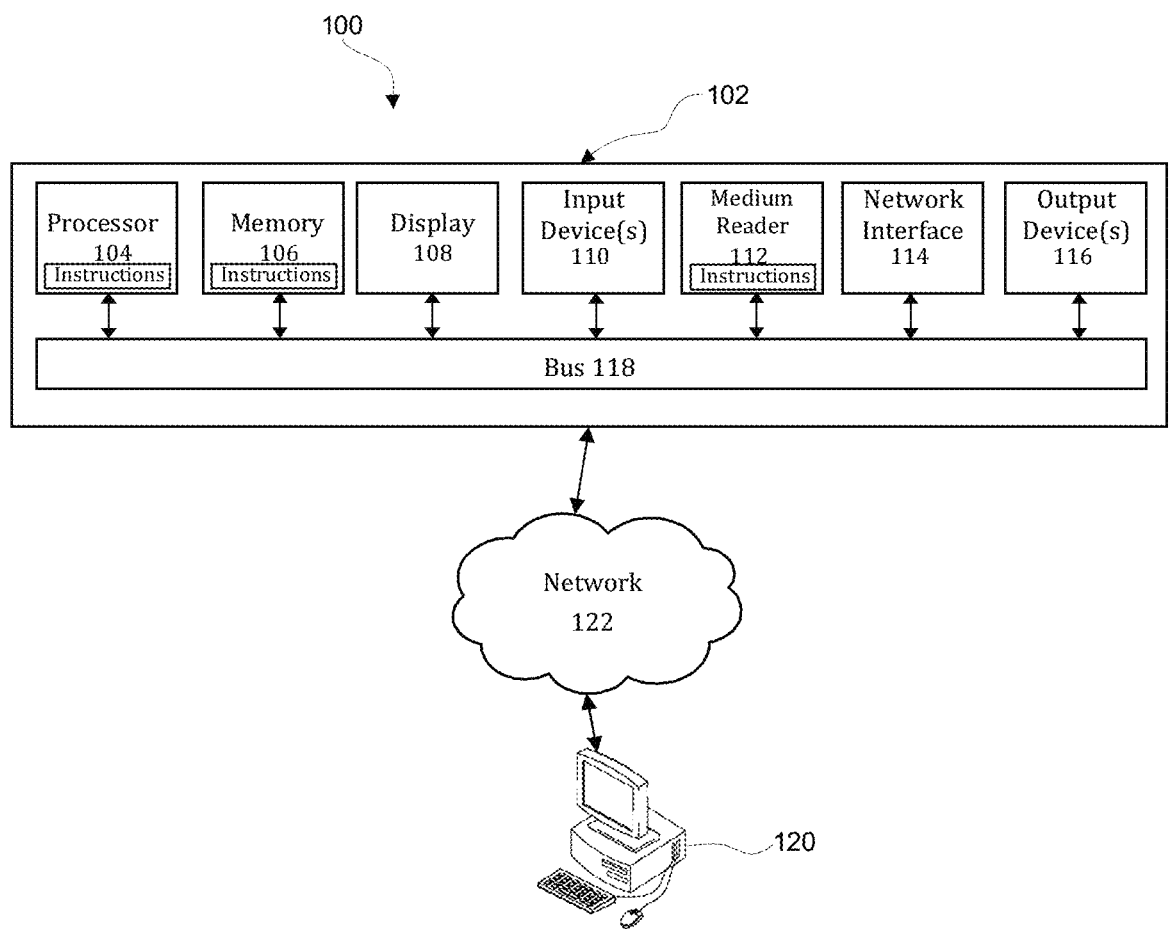
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for handling large number of customer service interactions to ensure efficient and accurate interaction servicing results.

Figure 2:
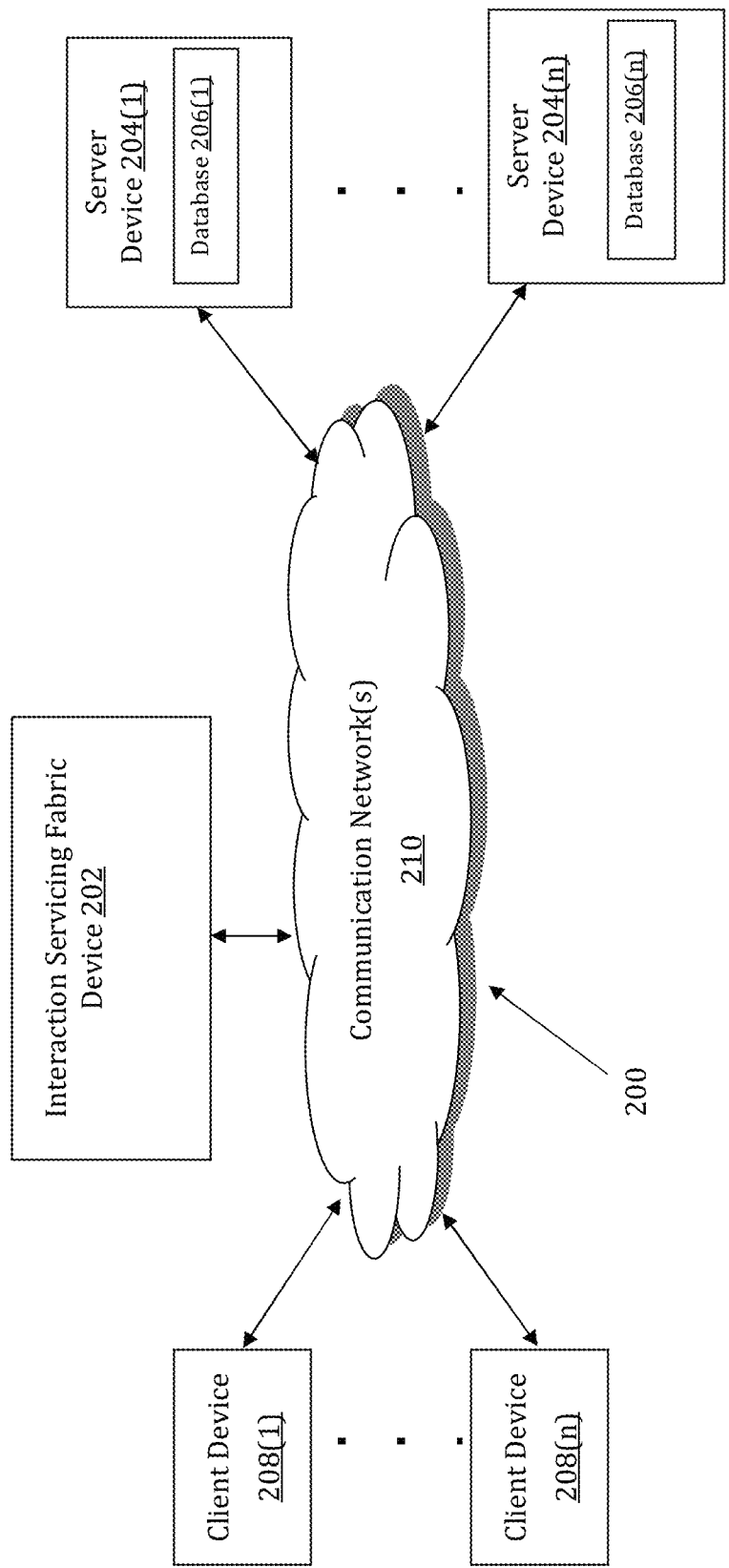
FIG. 2 illustrates an exemplary diagram of a network environment.

Referring to FIG. 2, a schematic of an exemplary network environment 200 for implementing a method for handling large number of customer service interactions to ensure efficient and accurate interaction servicing results is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for handling large number of customer service interactions to ensure efficient and accurate interaction servicing results may be implemented by an Interaction Servicing Fabric (ISF) device 202. The ISF device 202 may be the same or similar to the computer system 102 as described with respect to FIG. 1. The ISF device 202 may store one or more applications that can include executable instructions that, when executed by the ISF device 202, cause the ISF device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ISF device 202 itself, may be located in virtual server(s) running in a cloud-based computing environment rather than being tied to one or more specific physical network computing devices. Also, the application(s) may be running in one or more virtual machines (VMs) executing on the ISF device 202. Additionally, in one or more embodiments of this technology, virtual machine(s) running on the ISF device 202 may be managed or supervised by a hypervisor.

In the network environment 200 of FIG. 2, the ISF device 202 is coupled to a plurality of server devices 204(1)-204(n) that hosts a plurality of databases 206(1)-206(n), and also to a plurality of client devices 208(1)-208(n) via communication network(s) 210. A communication interface of the ISF device 202, such as the network interface 114 of the computer system 102 of FIG. 1, operatively couples and communicates between the ISF device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ISF device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ISF devices that efficiently implement methods and systems for handling large number of customer service interactions to ensure efficient and accurate interaction servicing results.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ISF device 202 may be a standalone device or integrated with one or more other devices or apparatuses, such as one or more of the server devices 204(1)-204(n), for example. In one particular example, the ISF device 202 may include or be hosted by one of the server devices 204(1)-204(n), and other arrangements are also possible. Moreover, one or more of the devices of the ISF device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ISF device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. An Availability Zone is equivalent to a pool. The server devices 204(1)-204(n) hosts the databases 206(1)-206(n) that are configured to store data that relates to user requests, identification information that relates to individual users, and microservices that are used for resolving user requests.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ISF device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ISF device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ISF device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ISF device 202, the server devices 204(1)-204(n), or the client devices 208(1)-208(n), for example, may be configured to operate as virtual instances on the same physical machine. In other words, one or more of the ISF device 202, the server devices 204(1)-204(n), or the client devices 208(1)-208(n) may operate on the same physical device rather than as separate devices communicating through communication network(s) 210. Additionally, there may be more or fewer ISF devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
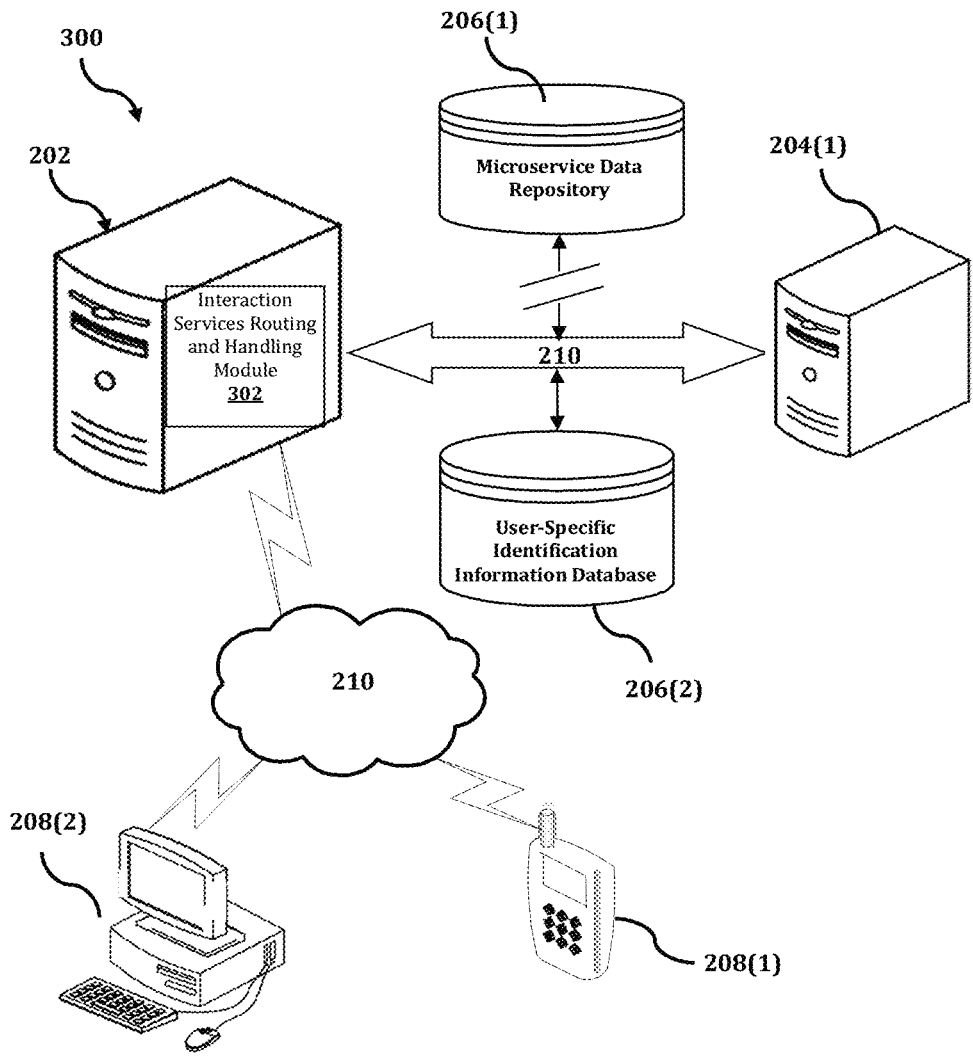
FIG. 3 shows an exemplary system for implementing a method for handling large number of customer service interactions to ensure efficient and accurate interaction servicing results.

The ISF device 202 is described and illustrated in FIG. 3 as including an interaction services routing and handling module 302, although it may include other rules, policies, modules, databases, or applications, for example. As will be described below, the interaction services routing and handling module 302 is configured to implement a method for handling large number of customer service interactions to ensure efficient and accurate interaction servicing results.

An exemplary process 300 for implementing a mechanism for handling large number of customer service interactions to ensure efficient and accurate interaction servicing results by utilizing the network environment of FIG. 2 is illustrated as being executed in FIG. 3. Specifically, a first client device 208(1) and a second client device 208(2) are illustrated as being in communication with ISF device 202. In this regard, the first client device 208(1) and the second client device 208(2) may be "clients" of the ISF device 202 and are described herein as such. Nevertheless, it is to be known and understood that the first client device 208(1) and/or the second client device 208(2) need not necessarily be "clients" of the ISF device 202, or any entity described in association therewith herein.

Any additional or alternative relationship may exist between either or both of the first client device 208(1) and the second client device 208(2) and the ISF device 202, or no relationship may exist. For example, the ISF device 202 and the first client device 208(1) may be configured as the same physical device.

Further, ISF device 202 is illustrated as being able to access a microservices data repository 206(1) and a user-specific identification information database 206(2). The interaction services routing and handling module 302 may be configured to access these databases for implementing a method for handling large number of customer service interactions to ensure efficient and accurate interaction servicing results.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ISF device 202 via broadband or cellular communication. Alternatively, the process may be executed by the ISF device 202 in a standalone manner, e.g., by a smart phone on which the interaction services routing and handling module 302 has been downloaded. Of course, these embodiments are merely exemplary and are not limiting or exhaustive.

Upon being started, a processor that is hosted in the ISF device 202 executes a process for handling large number of customer service interactions to ensure efficient and accurate interaction servicing results. An exemplary process for handling large number of customer service interactions to ensure efficient and accurate interaction servicing results is generally indicated at flowchart 400 in FIG. 4.

Figure 4:
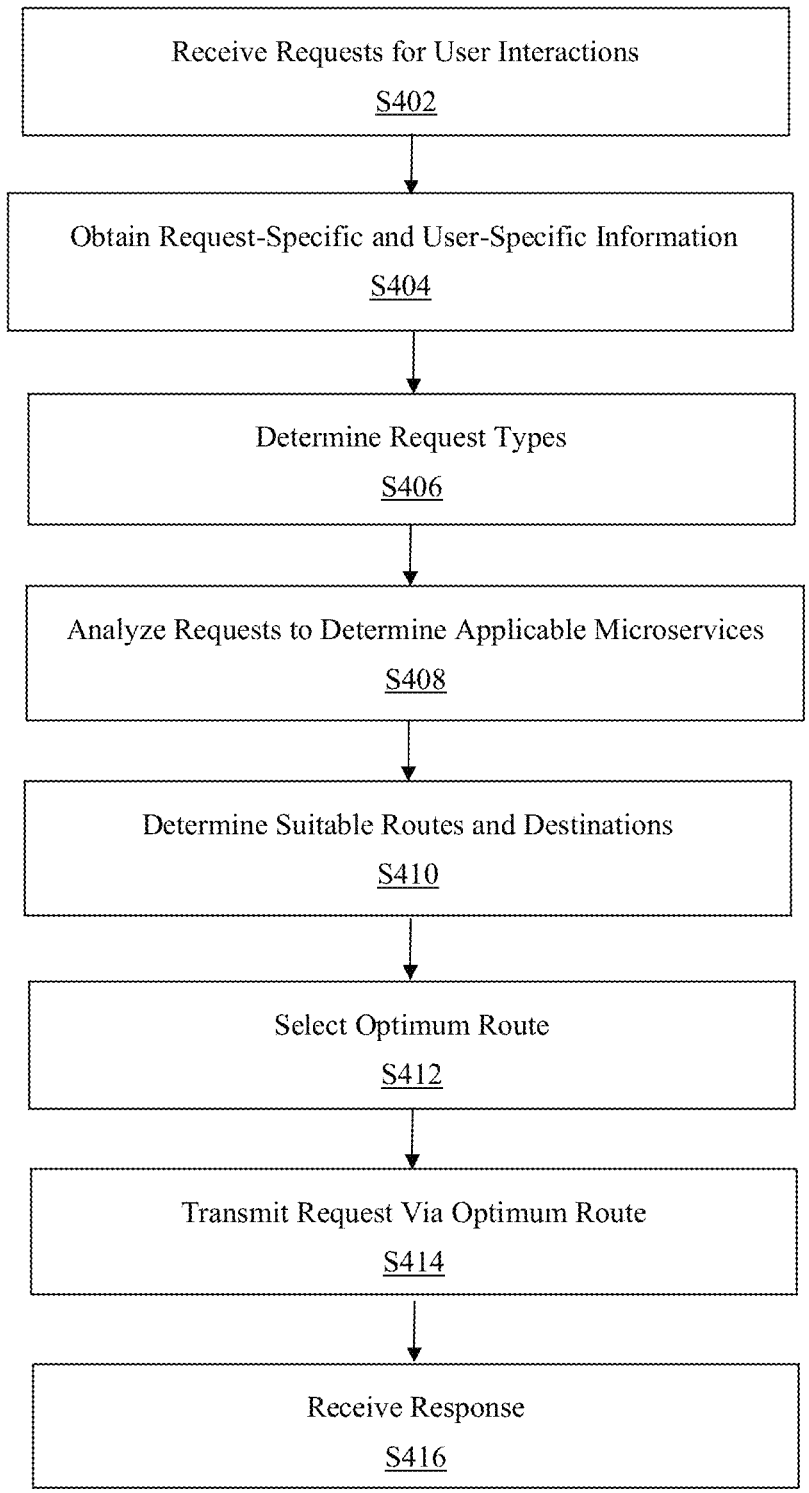
FIG. 4 is a flowchart of an exemplary process for implementing a method for handling large number of customer service interactions to ensure efficient and accurate interaction servicing results.

In process 400 of FIG. 4, at step S402, the interaction services routing and handling module 302 receives, from each of a plurality of users, a respective request for a corresponding interaction. At step S404, the interaction services routing and handling module 302 obtains request-specific information that relates to each respective request and user-specific information that relates to each respective user. In an exemplary embodiment, the interaction services routing and handling module 302 prompts each user to enter the user-specific information via a graphical user interface that is displayed on the screen of a client device 208.

Figure 5:
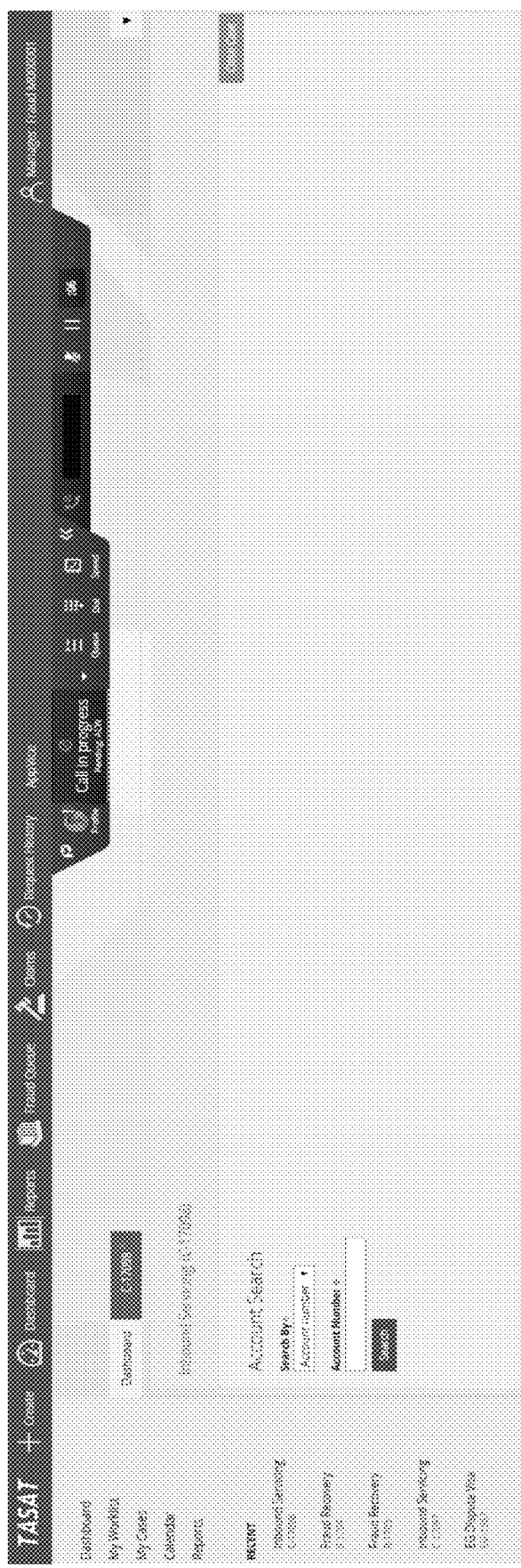
FIG. 5 is a first screenshot that illustrates a user interface for handling a customer interaction, according to an exemplary embodiment.
Figure 6:
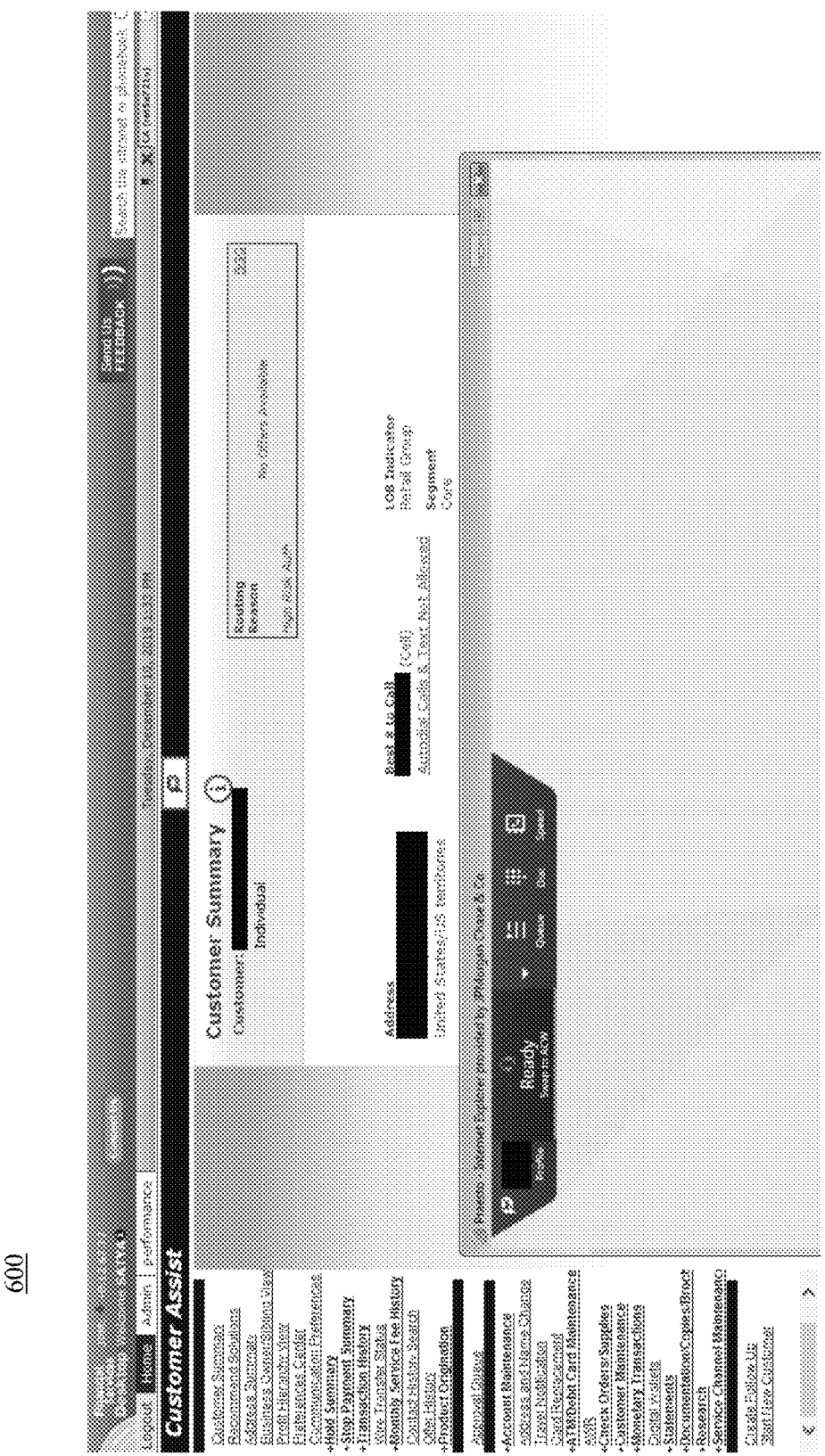
FIG. 6 is a second screenshot that illustrates customer identification information that is displayable on the user interface for handling a customer interaction, according to an exemplary embodiment.

Further, the interaction services routing and handling module 302 may also display, on a screen of the IDF device 202, a user interface for handling an interaction request that includes at least a subset of the request-specific information and at least a subset of the user-specific information. For example, referring to FIG. 5, a first screenshot 500 that illustrates a user interface for handling a customer interaction may include a task bar at the top of the screen, a trapezoidal-shaped ribbon that includes request-specific information and user-specific information at the top right-hand portion of the screen, a menu and a list of recent interactions along the left side of the screen, and status information relating to the current interaction request in the body of the screen. As another example, referring to FIG. 6, a second screenshot 600 that illustrates the user interface may include more details of the user-specific information, together with the trapezoidal-shaped ribbon shown in FIG. 5.

At step S406, the interaction services routing and handling module 302 determines, for each interaction, a request type for each respective request. The request type may indicate a communication mode by which a particular request is received. In an exemplary embodiment, the request type may include at least one of a voice request, an email request, an online chat request, a browser request, and a click-to-call request.

At step S408, the interaction services routing and handling module 302 analyzes, for each requested interaction, the request-specific information in order to determine at least one corresponding microservice and/or at least one microservice instance that is usable for handling the interaction. In an exemplary embodiment, the interaction services routing and handling module may determine more than one such microservice. For example, there may be any number of microservices that are suitable for handling different aspects of an interaction, such as two (2), three (3), five (5), ten (10), twenty (20), fifty (50), one hundred (100), or more such microservices; and some of these may have overlapping functions. As another example, there may be multiple microservice instances, which refers to using one particular microservice multiple times.

At step S410, the interaction services routing and handling module 302 determines at least one suitable route for transmitting the request-specific information and the user-specific information for each respective interaction to a respective destination that relates to the microservices determined in step S408. In an exemplary embodiment, for any given interaction, there may be more than one suitable route and more than one suitable destination, depending on the microservices to be used, and also depending on the order of using the microservices. As a result, the interaction services routing and handling module 302 may determine two or more suitable routes and/or two or more suitable destinations for a particular interaction. Then, at step S412, the interaction services routing and handling module 302 uses a metric that relates to workload distribution for selecting an optimum route; and at step S414, the interaction services routing and handling module 302 uses the optimum route for routing the information.

Figure 7:
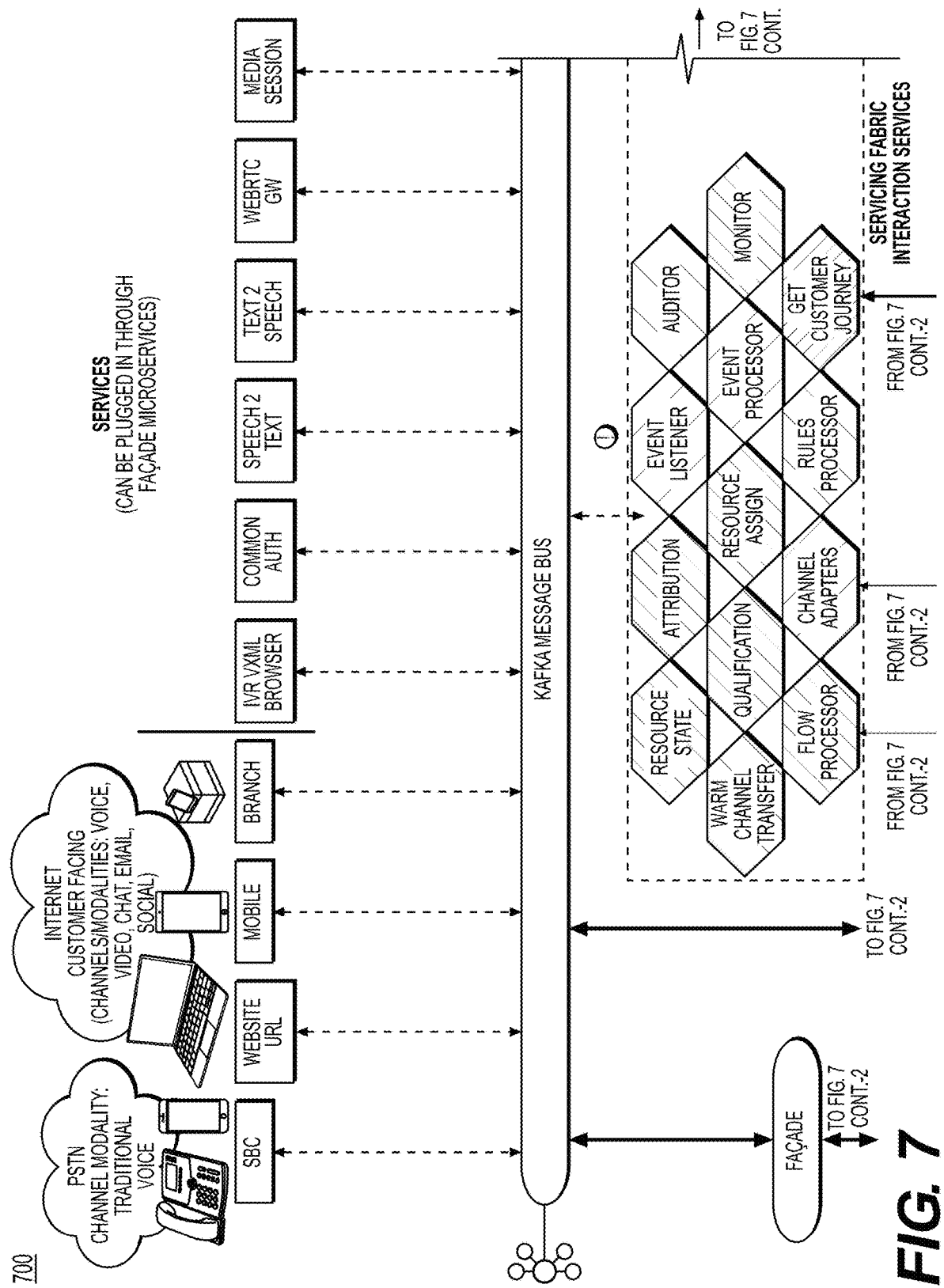
FIG. 7 is a diagram that illustrates a plurality of microservices and corresponding routing paths for implementing a method for handling large number of customer service interactions to ensure efficient and accurate interaction servicing results, according to an exemplary embodiment.
Figure 7:
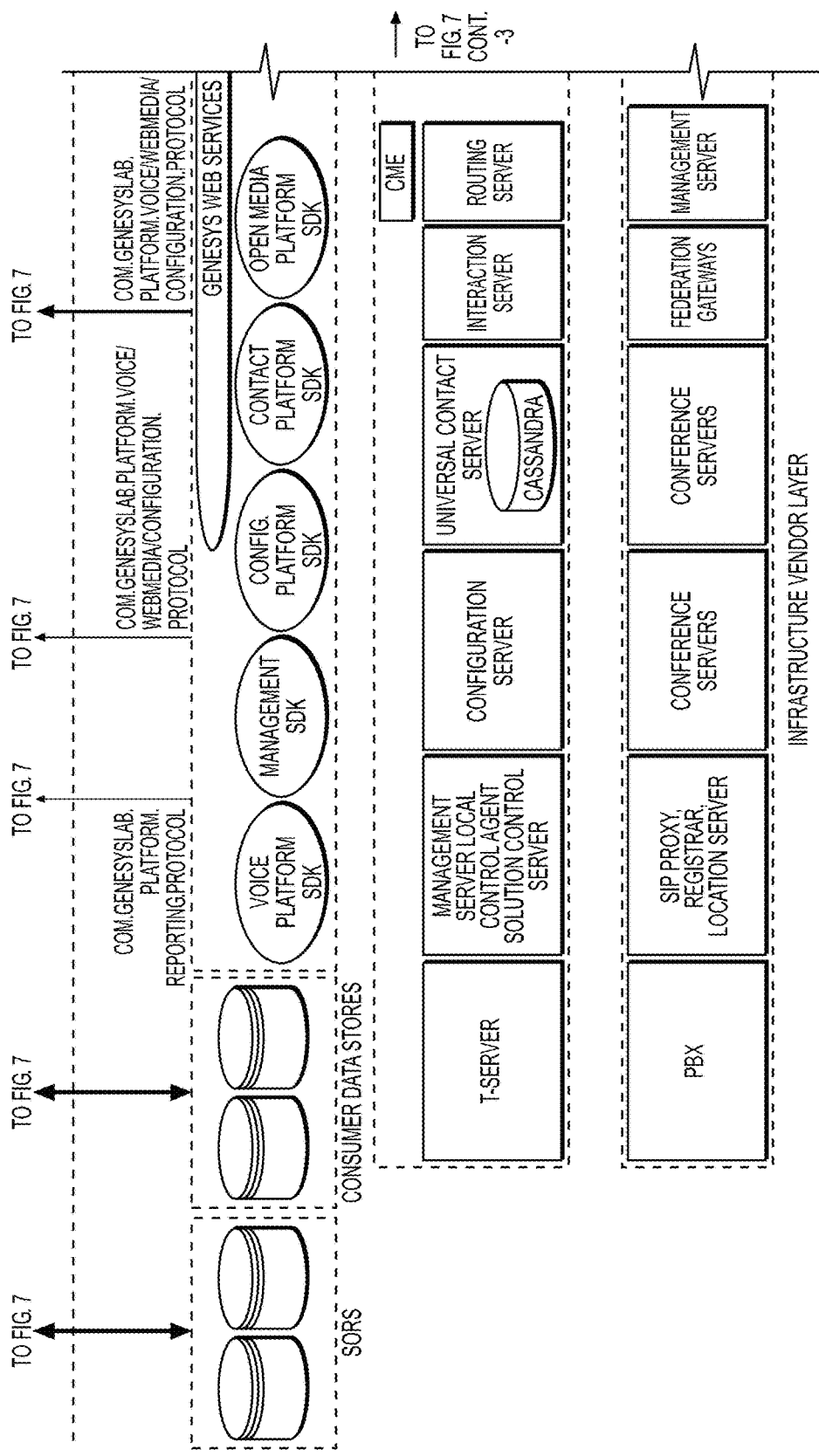
Figure 7:
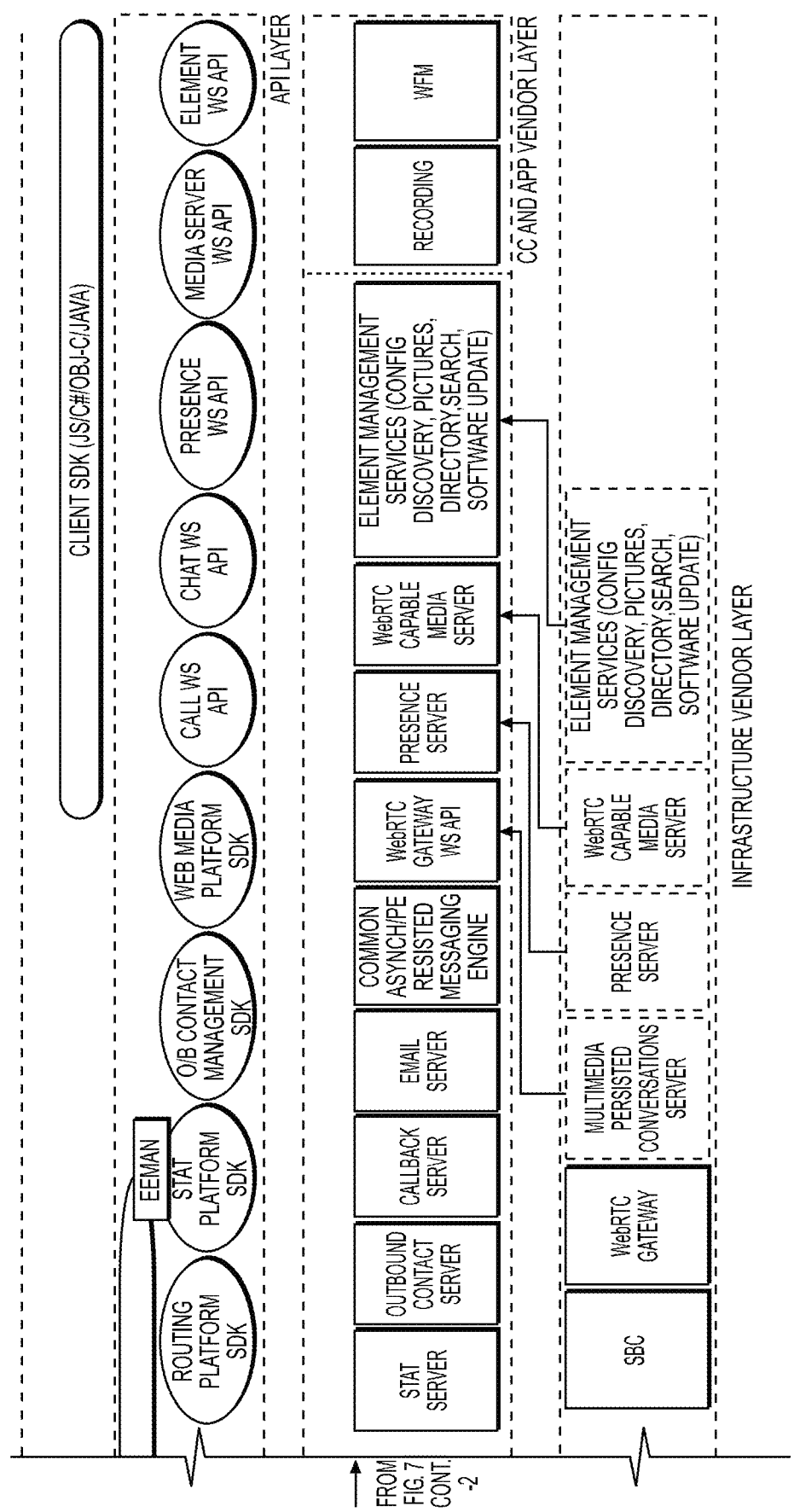

FIG. 7 is a diagram 700 that illustrates a plurality of microservices and corresponding routing paths for implementing a method for handling large number of customer service interactions to ensure efficient and accurate interaction servicing results, according to an exemplary embodiment. As illustrated in FIG. 7, a large number of microservices may be available for handling a particular request with respect to an interaction, including microservices having the following descriptors: "resource state"; "attribution"; "event listener"; "auditor"; "warm channel transfer"; "qualification"; "resource assign"; "event processor"; "monitor"; "flow processor"; "channel adapters"; "rules processor"; "get customer journey"; "specialist login"; "get specialist profile"; "get contacts"; "get communication history"; "receive voice & video call"; "invoke automated chat"; "invoke social"; "auditor"; "invoke simple chat"; "invoke conversation (multimedia)"; set disposition"; and "get customer journey".

Further, as also illustrated in FIG. 7 and in accordance with an exemplary embodiment, the microservices may be depicted in a honeycomb-type hexagonal pattern. In this manner, the analyzing of a particular interaction effectively breaks up the associated tasks into relatively small pieces that correspond to different microservices. In an exemplary embodiment, a cloud native microservices-based implementation, such as Kafka, is used, and in this construct, the honeycombs communicate with one other via events. The use of such an implementation provides several advantages, including the following: 1) Events must arrive in the proper order and must be scalable. 2) By partitioning the interactions, there is a low latency with respect to increasing or decreasing the number of microservices to be used (further noting that lower processing latency may be achieved by increasing the number of microservice instances). 3) By virtue of the ordering and the scalability of events, the interaction services handling module 302 achieves a higher throughput, thereby speeding up processing. 4) Load balancing and caching of IP addresses also contributes to higher processing speeds. 5) The ability to identify multiple redundancies in connections between microservices provides system resiliency and robustness. In an exemplary embodiment, events relating to a specific user session must be consumed in exactly the same order as the events were produced. Events relating to multiple user sessions need not be consumed, relative to each other, in the order in which they were produced. Distinguishing between events relating to a specific user session and events relating to multiple user sessions in this manner may facilitate a greater parallel processing capacity.

At step S416, the interaction services routing and handling module 302 receives response information that relates to a respective response for each corresponding request. In this aspect, in many situations, the received response effectively concludes the interaction.

In an exemplary embodiment, a cloud native microservice approach for an omni-channel contact center is provided. This approach includes decomposed contract bases microservices and a microservices-based event-driven architecture that resides in the cloud and is designed to have an elastic scale, high availability, and high resiliency, with a service level agreement (SLA) that is higher than 99.999%. The contact center is a real time (millisecond, sub-second latency) architecture that has an extensive intrinsic design. Groups of microservices are created in order to provide different aspects of functionality. The stack includes a platform as a service (i.e., microservices platform, such as, for example, Kubernetes or Cloud Foundry), Kafka scalable event messaging and streaming technology, Cassandra, NoSQL performant private database for microservices, and distributed in-memory grid technologies such as, for example, Cloud Cache, for storing quickly accessible state information.

The general architecture includes a facade layer of microservices adapting to external vendor elements through predetermined protocols, and normalizing the communication to fit a highly available, concurrent processing, resilient, large-scale, event-based communication; Kafka Topics for ordered events to consuming instances of microservices; client-facing microservices which consume raw Kafka events from façade microservices and provide discrete functional services with a client-facing application programming interface (API)— RESTful Web Services; a general purpose notification service that provides a bidirectional low latency event exchange mechanism between clients (e.g., single user web clients) or server applications (e.g., fraud ecosystems, voice biometric systems, analytics, and/or recording systems); web clients following microservices architecture with user interface (UI), software development kit (SDK), and Services architecture using Angular8 frameworks; drop-in concept for specialist phone control applications into various servicing applications delivering a computer telephony integration (CTI) container with all of the functionality included therein; programmatic APIs for screen pop; and standalone ribbon. Clusters of microservices are provided for core servicing fabric telephony and agent login; automated specialist provisioning across multiple vendor solutions for orchestration, routing, recording, voicemail, and other functionalities; specialist phone control; and real-time dashboard for contact center supervisory personnel.

In another exemplary embodiment, a client ribbon embedding mechanism that is suitable for a large scale deployment and integration with key value pairs (KVPs) for screen pops is provided. The client ribbon embedding mechanism includes a self-contained feature set that is extensible to omni-channel without requiring extensive deployment and knowledge of CTI protocols and APIs by non-contact center developers. The mechanism creates a lightweight approach to integrating contact center specialist features into the servicing application, thereby providing a quicker rollout, reduced integration effort, and automatic updates for easier maintenance. The mechanism includes standardized integration patterns and a cookbook recipe approach, and provides a way to obtain integrated features required by servicing applications. These features may include: screen pops; updating customer relevant data; end call tracking; state change tied to case disposition; transfer and conference events; customized call notifications; and enabling key value observers (KVOs) to be updated by servicing applications, middleware, and fraud authentication systems.

In yet another exemplary embodiment, a Kafka usage for converting stateful ordered events to stateless, scalable eventing in real time is provided. The design includes concurrent data-center (DC) and pool-specific active and backup topics on multiple Kafka clusters in order to handle catastrophic pool failures. In an exemplary embodiment, a pool refers to an instance of the cloud platform so that multiple pools within a DC provide resiliency in the event of a failure of a single pool (e.g., a bad network router). Other features include cross-DC Kafka events to provide a telephony service that is abstracted from an affinity to one of many DC's. The use of a Kafka routing key that is tied to directory numbers (DNs) and design in partitioning may also be provided, in order to cause ordered events to go to particular consumers in a scalable manner. A sticky Kafka partition assignor to reduce latencies when the cloud system automatically scales up or down may also be provided, for overcoming a need to rebalance and/or resend on multiple hops that may otherwise introduce latencies. A sequential thread executor may also be provided to distinguish between events that may be processed in parallel from those that must be processed sequentially.

The Kafka usage may include a sticky pool-aware Kafka partition assignor to enable a cloud system to automatically scale up or down despite pool affinities, which require each message to be processed by an instance within that pool that would otherwise fail or be inefficient outside of that pool. The sticky pool-aware Kafka partition assignor is designed to minimize churn while allowing an application to reserve a partition in order to avoid any impact while scaling up. The sticky pool-aware Kafka partition assignor may also cause partitions to stick to respective pools so that affinities to each pool are unaffected during rebalancing.

The Kafka usage may also provide for handling affinities at the edge of the cloud where only one instance can process a particular message but Kafka has only crude routing capabilities. In this aspect, an application instance with an affinity, such as, for example, a web-socket to a specific client, supplies the client with a subscriptionId that happens to also be a Kafka routing key that guarantees that all messages sent to that client from back end services arrive, within a single hop, at the correct application instance. The application had previously reserved a partition, calculated as at least one universally unique identifier (UUID) that routes to the partition, so that the UUID(s) can be offered on demand to clients as subscription IDs.

The Kafka usage may also provide for multi-threading of the consumption of messages per Kafka partition while maintaining strict message ordering. In this aspect, for the vast majority of application, ordering only has meaning for messages produced with the same routing-key. Thus, the Kafka usage may be designed to process all messages received from a partition in parallel except for those messages with the same key which must be processed sequentially.

In still another exemplary embodiment, resiliency patterns and a client discovery service designed to overcome global load balancer (GLB) latencies is provided. Browsers and client desktops cache domain name system (DNS) resolution of uniform resource locators (URLs), and when the backend services or pools experience failures, the clients continue to attempt to generate requests to the same defunct destination. In such deployments, where no performant IP sprayers or gateways exist and where millisecond latency SLAs exit, there may be a disruption in the continuous availability of services. In this aspect, a client side resiliency that complements the multi-pool, multi-instance, and multi-data center availability for instant seamless connection is provided. The client first discovers services and capabilities, including backup pool URLs, according to current availability and user authorization. The discovery service provides intelligent backup URLs for stateful services, stateless services, and external server systems. A client software development kit abstracts the resiliency, rehydration, and reconnection logic, begins network recovery, and then does a seamless login. The client user interface automatically recovers from the loss of a websocket or failure of a cloud microservice in a pool.

In yet another exemplary embodiment, resiliency patterns and seamless resiliency of stateful, low latency telephony clients across multiple data centers (DCs). In each data center, stateful edge services monitor each extension (i.e., directory number) simultaneously from different instances on both pools, thereby providing both instance and pool resiliency. Such services may use a de-duper that receives events from both pools but propagates only one pool. For phone resiliency, extension (directory number) may move from one data center to another, and the servicing fabric in both data centers may detect the move and direct requests to the new data center. Failure to login causes a resynchronization of the phone state in both data centers, thus self-healing in case discovery becomes out of synchronization.

The following table provides a list of features and specific aspects thereof:

| Stateful Domain | Stateful → Stateless | Bidirectional WebSocket | Dealing with Vendor Egress High Affinity connections | Follow the Phone-DR failover |
|---|---|---|---|---|
| Low Latency | Minimize Latencies through colocation | Select Blazing Fast Technologies | Highly concurrent connections: vendor systems & clients | Custom Sticky Kafka Partition Assignor |
| Stack HA | Provide High Availability (HA) of CaaS, Kafka clusters under the cover | Leverage nascent resiliency in stack | Event Starters encapsulate High Availability (HA) | Standby Data Center (DC) Promotion |
| Load Balancing | Circuit Breaker Patterns: for end-user client and server-to-server (API2API) invocations, | Connection to Global Load Balancers (GLBs) for non-cloud servers | Phone and queue monitoring load balanced across a DC | Data extractions load balanced across Data Centers (DCs) |

-continued

| Stateful Domain | Stateful → Stateless | Bidirectional WebSocket | Dealing with Vendor Egress High Affinity connections | Follow the Phone-DR failover |
|---|---|---|---|---|
| | with backup Availability Zones | | | |
| Black Availability Zone Failure | Client Side Recovery (Web Socket disconnect, Availability Zone failure, app failure) | Kafka moves all load to other Availability Zone in less than 3 sec | Subscriptions replicated across Availability Zones | SDK connects to other Availability Zone |
| Grey Availability Zone Failure | AZ aware Sticky Partition Assignor isolates network issues in Availability Zones | Multiple layers of defense for grey failures | OAUTH2 Authorization across multiple Availability Zone environment | Cloud Config Server has all the bootstrap info, Prod: Bitbucket |

In still another exemplary embodiment, defense mechanisms for handling grey failures in the cloud are provided. A first defense mechanism is a sticky partitioner that is designed to handle a scenario in which one pool is bad, and even while sharing the same Kafka and Cassandra across two pools, events would zigzag across applications in the two pool, thereby increasing the probability of a grey failure when any microservice in a second pool begins to go bad, and also affecting all traffic. The sticky partitioner addresses this scenario by isolating network issues in pools by primarily routing the events to the same pool, thereby ensuring that 50% of the traffic is not affected by an unhealthy grey pool.

A second defense mechanism is the use of multiple levels of defense for grey failures so that a single failure does not equate to a request failure as it is retried across other pools and/or other mechanisms. For example, for a scenario in which an external server application issues a request to a pool that is only partially able to service the request, thereby resulting in a failure, this defense mechanism is designed to propagate all information available for servicing the request in a second attempt on another pool. If the second pool is able to find the remaining missing data from the first pool, then the second pool processes the request.

A third defense mechanism is the use of multiple layers of defense for grey failures for stateful applications so that a single failure does not equate to a request failure as there are multiple resiliency designs at each stage of the microservice in order to ensure servicing the request. For example, for a scenario in which a ribbon login fails because a CTI extension monitoring had failed or was interrupted, or because the request was routed to the wrong pool, or because the directory number is not in service, this defense mechanism is designed to perform several functions, including the following: CTI monitors directory number changes at all times; directory number in-service and out-of-service events are propagated across both data centers; if the login attempt comes to a data center where the directory number is out of service, CTI will ask the other data center's CTI to publish if the directory number is in service in that data center; repeat a set up from scratch for failed connections for some CTI directory number; delegate some failed connections for some CTI directory number from one CTI to a backup CTI; and recovery code in ribbon client to go into retry mode and determine when the directory number status changes, thereby self-healing.

In yet another exemplary embodiment, high efficiency reliable bidirectional messaging for low latency applications is provided. This embodiment includes several features. A first feature is an ability to send a Kafka event direct to the instance hosting the web-socket for the final leg of delivery with a minimum possible latency. This is achieved by calculating a UUID that maps to a partition owned by the notification-service instance so that all messages sent using that UUID as a Kafka routing key are delivered directly to the correct one of many notification-service instances.

A second feature is an ability to scale up a number of instances without any latency nor disruption to existing web-socket users. This is achieved by using a custom stick partition assignor whereby the consumer is guaranteed that one partition is never removed. This also avoids two-hop routing.

A third feature is load balancing of system-wide events to another ecosystem through stateless, load balanced, randomized delivery on any of the web-sockets (WS). This feature provides an ability to load-balance events that can be consumed by a group of web-socket clients. This is achieved by allowing each member of a load-balancing (LB) group to subscribe with the name of the LB group so that future messages received by a notification service on a UUID that belongs to the group can be delivered to any member.

A fourth feature allows for more than one web-socket to be part of a high availability (HA) group to ensure low latency and guaranteed delivery on a surviving web-socket. This feature provides an ability to support clients that require a highly available pair of web-sockets where ordered events are delivered via an "active web-socket" only, and when it fails, the surviving web-socket is immediately promoted to being active. Thus, a latency that would have occurred without the HA group is completely avoided. Meanwhile, the client will initiate a new backup web-socket. To protect against failure or down-scaling, upon receiving a new web-socket request with an HA group identification, the corresponding notification service will reject a request to create a second web-socket in the same HA group on the same instance.

A fifth feature provides an ability to support message delivery from clients in multiple pools. This is achieved by using Kafka's native ability to route messages using a routing key so that the producer of the message only needs to know the Kafka cluster address.

A sixth feature provides an ability to subscribe anywhere, replicate everywhere, and notify anywhere. This feature further provides an ability to support message delivery from clients in multiple data centers (DCs) whereby when a message is received in one DC where the UUID is not recognized, the notification service will query a database to determine the Kafka cluster associated with the UUID so that the message is delivered in a second hop. In this manner, the client need not be concerned with the DC affinity of the web-socket.

A seventh feature provides an ability to act as a durable message provider by which no messages are lost. This feature further provides an ability to cache events in case a client is temporarily absent, providing a fire and forget service for microservices. This is achieved by caching undeliverable events for a configurable amount of time after a web-socket disconnects. On reconnection, the client will present, via a web-socket message, an identifier that maps it to the previously used UUID, and the notification service will then deliver all cached messages before continuing with normal message delivery.

An eighth feature provides a client side home pool, which allows clients to receive events more quickly by directing them to a more efficient pool. The efficiency is improved through locality, speedier delivery of events for co-located microservices, and Kafka, together with vendor gear for a particular user.

A ninth feature provides a common utility framework to notify any client independent of any type of microservices (i.e., a sender of an event). The common utility framework manages the client notification channel and is a common utility for services, thus abstracting them from the delivery details.

A tenth feature provides client session management via termination lifecycle events, which are being sent to all microservices. An eleventh feature provides abstracting of the Kafka resiliency architecture (e.g., dual DC or standby DC) via a mere web-socket delivery.

Taken together, these features provide additional advantages, including the following: First, ribbon clients were preferred not to talk to Kafka because it would require a partition for each user, but an excessive number of partitions would not be supported by Kafka, because of a lack of scalability, or else users would receive events that were intended for other users. Second, web-sockets are used for low latency, but the present embodiment uses a common web-socket towards a client, and routes all events from various microservices on the same channel.

There are many scenarios where a client sends requests to a single IP Address repeatedly even though the services are down. This could be due to local DNS resolution caching, and could also be due to delays caused by the time taken for GLBs to detect the services being down.

The latencies in the above-described scenario disrupt telephony communications due to the nature of real time low latency communication. Despite providing resiliency for multipool/multi-data center microservices, clients send requests to the services that are down, due to local DNS resolution caches, for 20 minutes or more, depending on the operating system and browser settings.

High Efficiency, Reliable Bidirectional Messaging for Low Latency Applications: Applies to 1) systems that use a message bus based on topics and partitions for very high throughput; 2) many single instance applications that operate independently; and 3) many multi-instance applications that require load-balancing.

In an exemplary embodiment, the present disclosure provides methods for: 1) latency-free scale-up and routing messages directly to a specific target application instance using a messaging system that uses topics, routing keys and partitions; 2) reliably delivering messages to the application despite failures in the client or of a network connection; 3) load-balancing messages across multiple instances of an application that form an application-type grouping; 4) supporting the above in multiple Availability Zones and Data Centers; and 5) handling overload by dropping the lowest priority messages.

In conventional systems, clients that wish to subscribe directly to a topic message system may use a dedicated topic based on the client-identifier. The message producers produce messages for specific clients to the client-specific topic based on the client-identifier. The client subscribes for messages using a topic name derived from the client's identifier. Alternatively, clients that wish to subscribe directly to a topic message system may use a shared topic with each partition dedicated to at most one client based on the client-identifier. The client and message producer(s) are coupled using an external client-identifier to partition mapping database. The client uses manual partition assignment to allocate their dedicated partition to themselves. However, both of these approaches are typically scalable to only a few thousand clients because of the overhead of having so many topic-partitions for the brokers to manage.

Clients that wish to subscribe to a microservice that delivers events via a Web Socket must incur latency as the service performs multiple-hop routing to deliver the event to the correct instance. Another alternative would be to use broadcast messages but this reduces scalability of the solution.

Another conventional approach is for each instance of Notification Service to subscribe for all events and to discard those events that cannot be routed to a client. However, this approach is inefficient, is not scalable to hundreds of thousands of events per second, and does not provide reliable delivery in the case of temporarily unavailable websockets.

Another conventional approach is for a client to poll a database to detect when a message has to be sent to the client. Backend services that wish to send a message to the client, deposit the message in the database so that it will be picked up by the polling thread. However, this approach introduces unnecessary latency and its scalability is limited by the need to poll for a large number of clients. Further, yet another conventional approach is to use a "sticky sessions" on a front-end HTTP load-balancer.

In an exemplary embodiment, the following is a glossary of terms to be used below:

Notification Service: A microservice hosting websockets for exchanging events with many clients. Receives subscription messages from client and maintains a map of NID to web socket to facilitate delivery of events. This is a common utility used by many other microservices in order to deliver the message to the client. The actual message content is opaque to the notification service.

Client is the user application that wants to receive events. It obtains a unique ID from Notification Service and then uses this ID in all subscriptions to event generating microservices ('Event Provider').

Event Provider microservice: These microservices are responsible for generating events of a certain functionality (e.g. Call or Presence or User-Status). Receives a subscription from the client and then creates messages suitable for sending to a client in JSON format and then sends these messages to the Notification Service for delivery to the specific client in accordance with the client's subscription.

Figure 9:
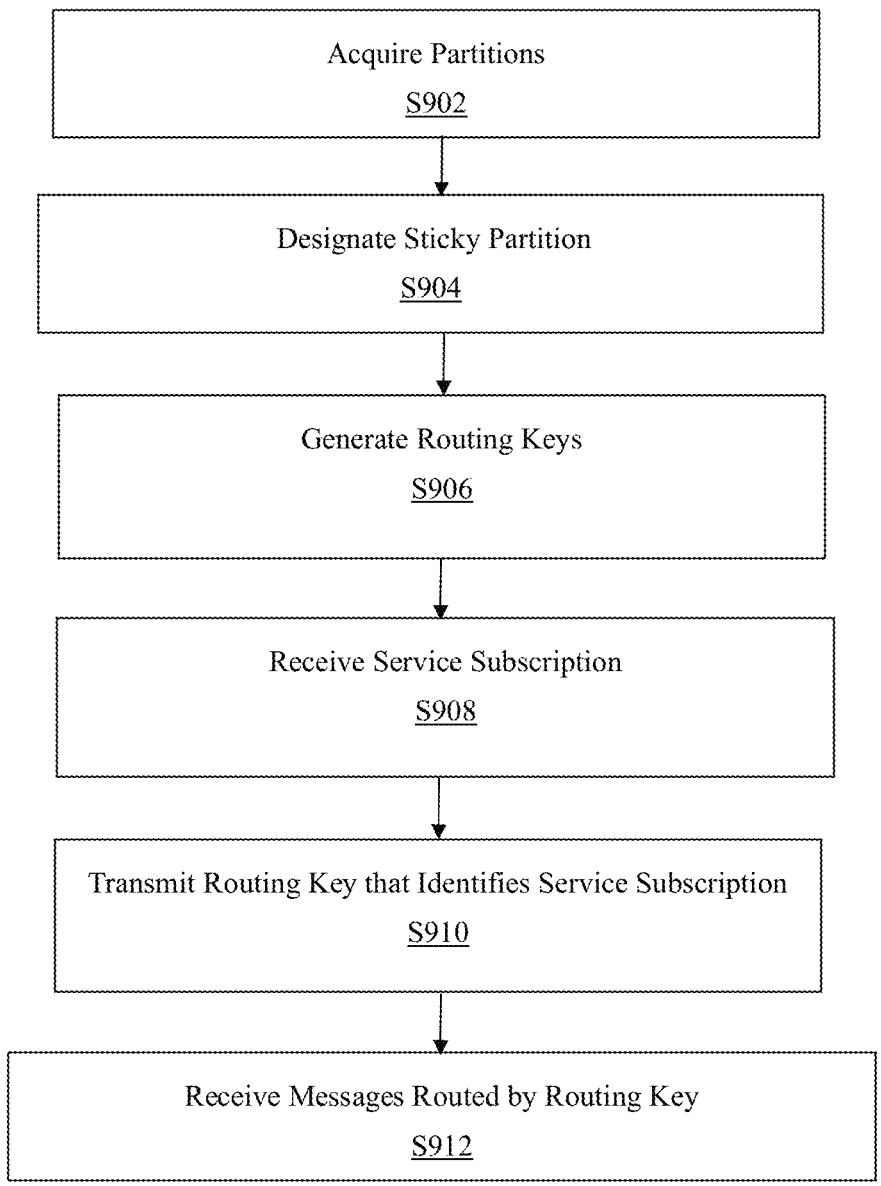
FIG. 9 is a flowchart of a method for routing a message to an application in a messaging platform environment, according to an exemplary embodiment.

FIG. 9 is a flowchart 900 of a method for routing a message to an application in a messaging platform environment, according to an exemplary embodiment.

Method-1: Single-hop routing to service hosting websockets: In a system where a Kafka message can only be processed by one of many consumers, one conventional approach is to accept that messages with a routing key will usually arrive at the wrong instance and correct that using two hop routing together with a cache of "key-to-instance" and "instance-to-partition" mappings. Another conventional approach is for the message Producer to co-operate with the Consumer by producing the message to a particular partition that it knows is owned by the target Consumer instance. This, however, couples Producer and Consumer and requires communication to handle setup and rebalancing. Use of Kafka is discouraged where this requirement exists.

Referring to FIG. 9, in an exemplary embodiment, the present disclosure provides a mechanism to solve the problem in the Consumer while maintaining loose or no coupling between Producer and Consumer, as follows: 1) On startup, the Kafka Consumer registers with a sticky partitions assignor and acquires 1:n partitions (operation S902. 2) Consumer identifies one of the n partitions, e.g., the lowest partition, to be its sticky partition (operation S904). 3) Consumer generates a store of routing keys that it knows route to the sticky partition (operation S906) by creating random keys and either 3a) applies Kafka's hash+mod algorithm and discards those keys which do not map to the sticky partition, or 3b) produces them to the "inbound" topic and on consumption, stores keys from the sticky partition. 4) Consumers receive a subscription for a service supplied by the consumer via any mechanism (REST, Kafka, etc.) (operation S908). It returns an unused routing-key from its store as a subscription-identifier. 5) The client, on receiving a subscription response with a subscription-identifier, subscribes to other services using the same identifier (operation S910). 6) When the other services wish to send a message to their client, they send each Kafka message using the client's identifier as the routing key. The message will now route directly to the one-and-only consumer capable of processing that message (operation S912).

Figure 8:
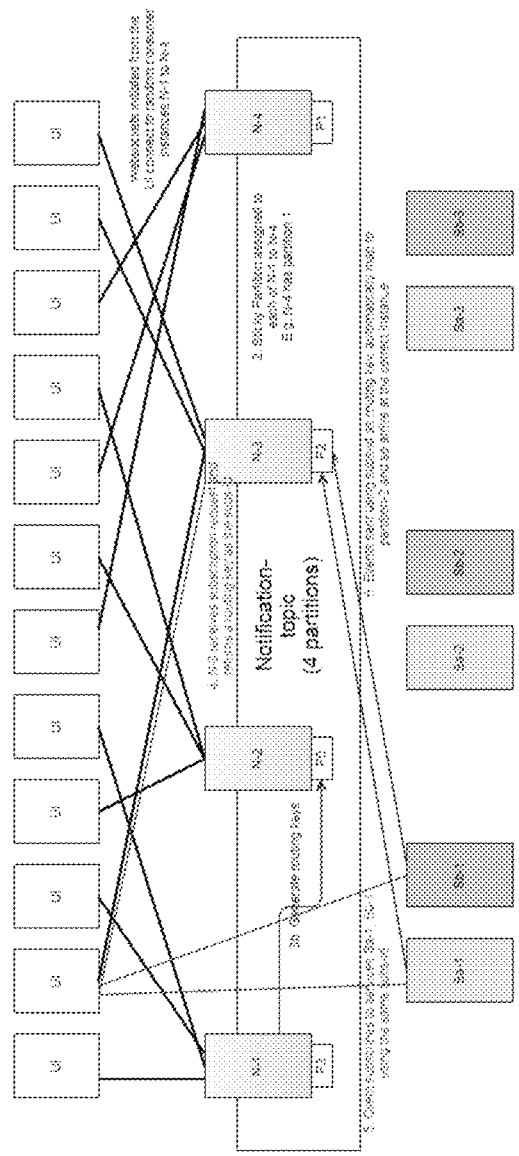
FIG. 8 is a data flow diagram that illustrates consumer affinity in an a messaging platform environment, according to an exemplary embodiment.

FIG. 8 is a data flow diagram 800 that illustrates consumer affinity, according to an exemplary embodiment. Referring to FIG. 8, the Consumer has no control over which UI's connect to it via a websocket. The result is that a message from Producer Sa-1 destined to only one of the many UI's must be routed to the particular instance N-3 that hosts the websocket. This must be done without the Producer having any knowledge of which partitions are assigned to the Consumer and without any knowledge of websocket wiring, and to reduce latency, should be achieved in a single hop.

In one exemplary embodiment, an assignor of step-1 is Kafka's standard sticky partition assignor, which reduces the probability that the partition is moved during rebalancing. In the case where the partition is removed due to rebalancing, two hop routing is required together with a cache of "key-to-instance" and "instance-to-partition" mappings.

In another exemplary embodiment, a customized Kafka partition assignor algorithm is used to guarantee that in the event of rebalancing (i.e., where the number of consumers increases or decreases), the sticky partition is never removed from the consumer that initially acquired it, for as long as that consumer remains healthy. 1) On Kafka rebalancing, when a consumer-instance has acquired its first set of partitions, it chooses one as its "hard sticky partition." 2) On every subsequent rebalance, 2a) the consumer is queried for metadata that will be supplied to the lead assignor and returns either only the hard-sticky partition or all existing partitions with a weighting for each partition, the hard-sticky being the most sticky; 2b) on receipt of the set of metadata from all instances of the consumer-group, the lead assignor reads the hard-sticky partition from every instance and allocates it back to its owner. It then allocates the remaining partitions using the supplied weightings if any or using any other algorithm such as "sticky" or "round-robin"; 2c) the lead assignor returns the assignment decisions which are distributed to consumers using the existing mechanism; and 2d) consumers receive their new assignment which includes the hard-sticky partition.

Scaling-up Notification Service: In an exemplary embodiment, this approach supports scaling up notification service without any impact to the client. In the exemplary embodiment described above, only one of the Kafka partitions was used to receive messages. Remaining partitions are available for assignment to new instances and will only be used if selected as the primary sticky partition on the new instance. Scaling down of notification service does cause websockets to break.

Management of Notification Identifier (NID) Lifecycle: In an exemplary embodiment, the following approach does not require the client to gracefully unsubscribe when no longer using the websocket.

Setup: Topic "notification_life_cycle" with produce permissions granted to notification-service and client permissions granted to all client microservices. Client microservices consume from this topic using an Availability Zones-specific consumer-id with the effect that each AZ gets on copy of each message.

1) Client creates a websocket. 2) Notification Service returns a NID. 3) Client subscribes to event source microservices using the NID as its subscription ID. 4) Event source microserivces send events that match the subscription to the client via the notification service. 5) Websocket drops for any reason. 6) Notification Service detects that the websocket drops and starts timer A. Note: if the instance hosting the websocket dropped, then timer A is started by the first microservice that fails to deliver an event. 7) If the client reconnects at a new instance using the old NID. then the NID-to-instance mapping is updated in the cache. 8) On expiry of timer A, read the NID-to-instance mapping. If the mapping still returns the local instance and if the local instance does not have a websocket corresponding to the NID, send a LifecycleChanged {state=terminated} message to topic "notification_life_cycle." 9) On receiving a "notification_life_cycle" event, delete the subscription.

Refresh: For a new websocket, Notification Service starts Timer B.

Figure 10:
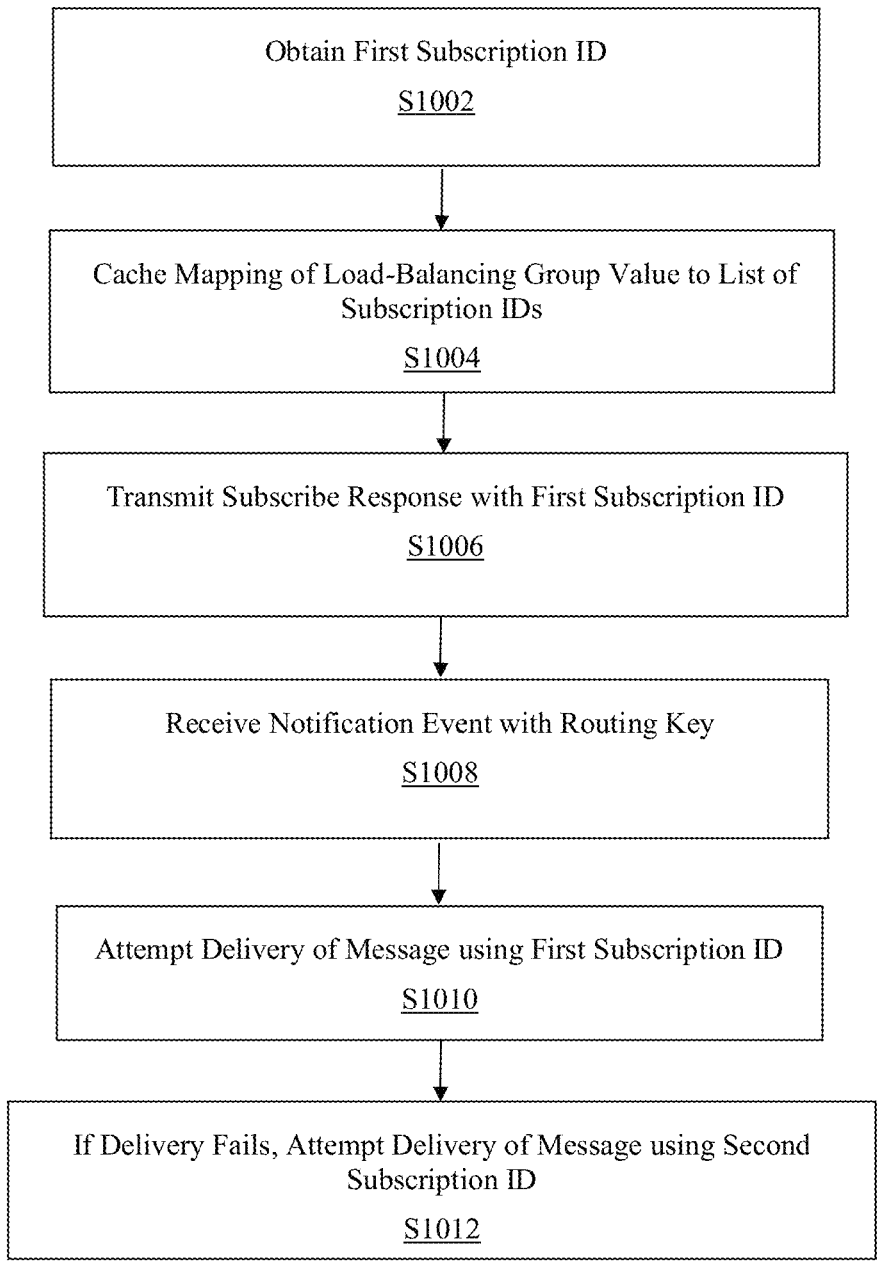
FIG. 10 is a flowchart of a method for load-balancing a delivery of messages in a messaging platform environment, according to an exemplary embodiment.

FIG. 10 is a flowchart 1000 of a method for load-balancing a delivery of messages in a messaging platform environment, according to an exemplary embodiment.

Method-2: Load-balance delivery of messages: In addition to single user client applications, there are clusters of server applications that also would like to receive events with high reliability, low latency as well as with load-balanced distribution across each instance in the server cluster. The notification microservice also caters to such server applications and provides them a load-balanced, highly available, low latency set of events using a concept of load-balanced and high availability grouping of websockets. All members of the same group are eligible for selection in order to deliver a message. Each client instance below refers to an instance of the server application that wishes to receive the events.

Referring to FIG. 10: 1) Each client instance establishes a websocket connection and sends a JSON subscribe with a "LB-group" attribute with a value that uniquely identifies the client grouping. 2) Notification service obtains a UUID subscription ID as per Method-1 for the subscription (operation S1002). 3) Notification service caches the mapping of the "LB-group" value to a list of IDs for the given LB-group (operation S1004) and returns the ID in a JSON subscribe response (operation S1006). 4) Client subscribes to "Event Provider" microservices using the ID obtained from step 3 and "LB-group" value. 5) Each "Event Provider" service receiving a subscription in step 4 caches the subscription and adds it to a randomized list of IDs for the given "LB-group" value.

6) On receiving an event, each "Event Provider" uses its cache to get a copy of the list of matching subscriptions. Non-group subscriptions are handled as per Method-1. If the list contains LB-group subscription(s), one subscription is selected at random from the LB-group list and the notification event is propagated using the ID of that subscription as the routing key. The other "LB-group" subscriptions are added at random to an "alternate-ID" header on the same message for resiliency reasons. 7) On receiving this notification event (operation S1008), the notification service will attempt to deliver to the client whose websocket subscription ID matches the ID specified in the routing key (operation S1010). 7a) On failure to deliver, it attempts to deliver to the next ID in the LB-group list that also has a websocket on the same notification-service instance (operation S1012). 7b) On failure to deliver in step 7a, it removes the ID on the local instance from the header and repeats so that all IDs on the local instance have been attempted. 7c) On failure to deliver in step 7b, it sends to the next NID in the list using a second hop.

Figure 11:
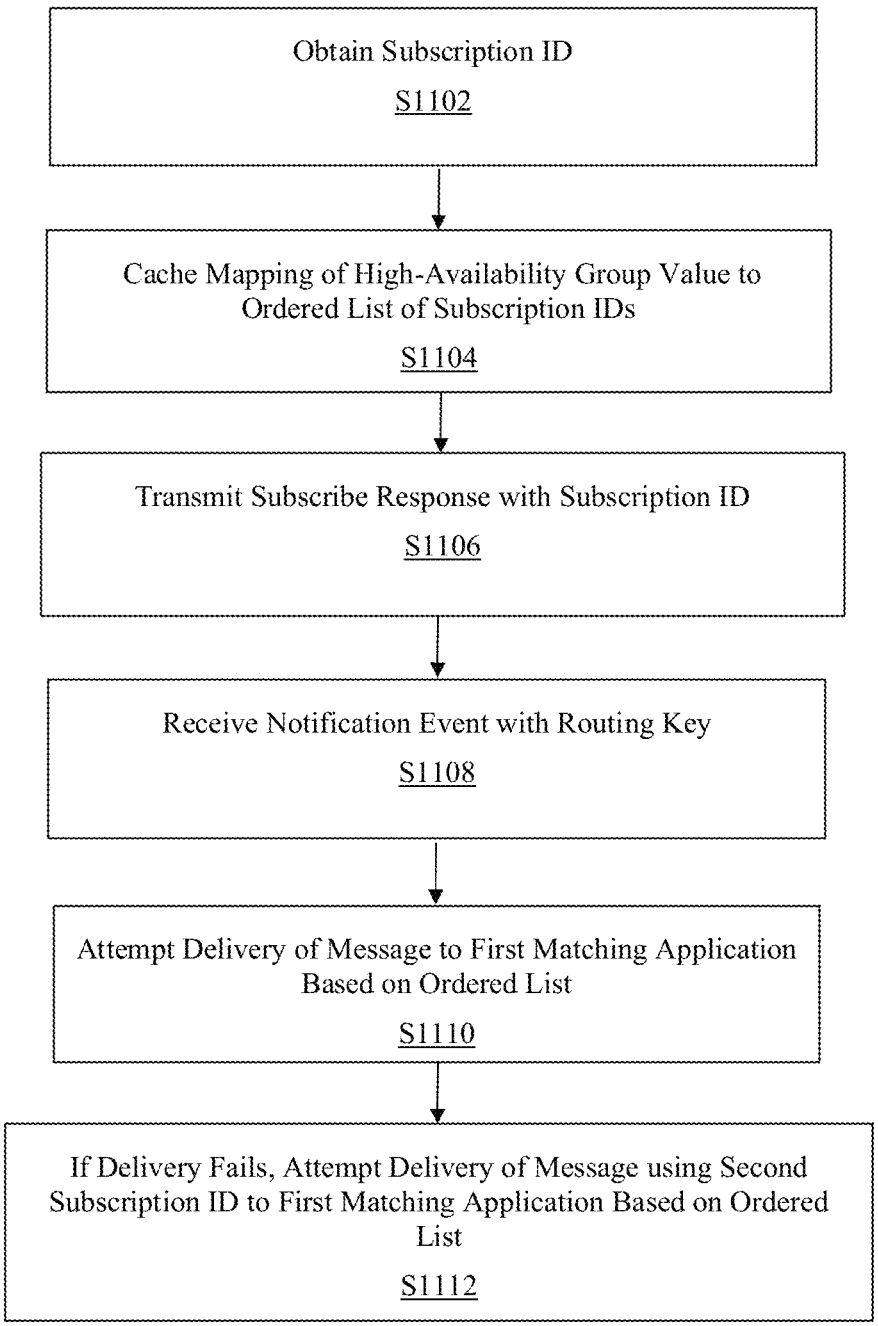
FIG. 11 is a flowchart of a method for ensuring a delivery of a message in a messaging platform environment despite a network connection failure, according to an exemplary embodiment.

FIG. 11 is a flowchart 1100 of a method for ensuring a delivery of a message in a messaging platform environment despite a network connection failure, according to an exemplary embodiment.

Method-3: Reliably deliver messages despite failures of a network connection: In an exemplary embodiment, the client will establish one or more redundant web socket connections to the notification service. Notification Service effectively uses one of the websockets as the primary and only on failure switches to a backup. The client must receive all messages via one of its websockets so that ordering is maintained. If a client unexpectedly loses a websocket connection, then it may create a new connection with the same high-availability (HA) "HA-group."

Referring to FIG. 11: 1) Client establishes a websocket connection and sends a JSON subscribe with an "HA-group" attribute with a value that is unique to the system. 2) Notification service determines if it already hosts a connection to the same HA-group at this instance, and if yes, for anti-affinity reasons in case the notification service instance fails, rejects the subscription request and closes the websocket with appropriate code (e.g. SERVICE_OVERLOAD). 3) Notification service obtains a UUID subscription ID as per Method-1 for the subscription (operation S1102). 4) Notification service caches the mapping of the "HA-group" value in an ordered list of IDs (operation S1104) and returns the ID in a JSON subscribe response (operation S1106). 5) Client repeats step 1 for the desired number of redundant connections.

6) Client subscribes to other microservices using the ID obtained in step 4. 7) Client service, having received a subscription from step 6, caches the subscription and adds it to a list of IDs for the given "HA-group" value. 8) On receiving an event, each 'Event Provider' service uses its cache to get a list of matching subscriptions. Subscriptions with the same HA-group are removed from the list. The remaining subscriptions are handled as per Method-1. The first subscription is selected from the HA-group list and the notification event is propagated using the ID of that subscription as the routing key. The other members of the list are added, in order, to an "alternate-ID" header on the same message. 9) On receiving this notification event (operation S1108), the notification service will attempt to deliver the message to the ID specified in the routing key (operation S1110). 9a) On failure to deliver, it attempts to deliver to the next ID in the "alternate-ID" header that is on the local instance (there should be none). 9b) On failure to deliver in step 9a, it removes the local ID from "alternate-ID" header and resends the message using the next NID from the remaining alternate-IDs (operation S1112). 9c) On failure to deliver in step 9b, undeliverable messages are dropped.

In a variant exemplary embodiment, messages that cannot be delivered in 9c may be cached for later delivery: 1) Client loses its websocket and reconnects using the ID from the previous session. 2) Notification Service validates that it still has a cached record of the old ID, returns the subscription response containing the old ID, and then delivers all messages from its cache before allowing any new messages to be delivered.

In another variant exemplary embodiment, two hop routing introduced in the previous exemplary embodiment is avoided: 1) Client loses its websocket and reconnects using the ID from the previous session. 2) Notification Service validates that it still has a cached record of the old ID, returns the subscription response containing a new ID, and then delivers all messages from its cache before allowing any new messages to be delivered. 3) On receiving a new ID, client must resubscribe to all services that it has subscribed using the old ID.

Method-4: Support multiple Availability Zones and Data Centers: 1) Client establishes a websocket connection and subscribes as per Method 1, 2 or 3 as described above. 2) Notification service caches the subscription in a distributed database, replicated across all DCs, before returning the ID in the subscription response. The cached subscription contains the data-center-id of the websocket. 3) Client subscribes to any client-microservice as per Method 1, 2 or 3 as described above. 4) Event Provider service, on receiving an event, queries its distributed cache to get a list of matching subscriptions. Subscriptions are sorted into sub-lists per data-center-id, and routing information is obtained for each data-center-id (e.g. Kafka cluster and topic) and then propagated to the notification-service in each DC.

In a variant exemplary embodiment, step 4 above is replaced by the following: 1) Event Provider service, on receiving an event, sends events directly to its local Notification Service as per Method-1 as described above. 2) Notification Service, on receiving an event that is not deliverable in that DC, queries its distributed cache to get a subscription for the given routing key. On finding a subscription with a non local-DC ID, Notification service maps the subscription's DC-ID to a Kafka cluster and topic and sends it to the remote DC. To prevent an infinite loop, it may include a "remaining-hops=0" header so that the message will not be sent back to a DC that has already processed it.

Method-5: Overload protection: 1) Event-Provider service adds header "executionTimeoutMs" to all messages that can be dropped in an overload condition. The value of the header increases with priority of the message. 2) Notification service consumes a message and starts an execution timer. 3) Notification service attempts to submit a task to a finite-sized work queue for ordered processing. The work-queue may be a sequential-executor. If the work queue is currently full, the submission will be delayed. The maximum time allowed on the submit API is calculated as the amount of time remaining. 4) When the task is removed from the work-queue in preparation for execution, only allow execution to proceed if the amount of time remaining is greater than zero.

In a variant exemplary embodiment, in addition to the above: 1) Client Service adds header "producedTime" to all messages that can be dropped in an overload condition. The value of the header is normally in Zulu time. 2) Notification service consumes a message and starts an execution timer. 3) Notification service attempts to submit a task to a finite-sized work queue for ordered processing. The work-queue may be a sequential-executor. If the work queue is currently full, the submission will be delayed. The maximum time allowed on the submit API is calculated as currentTime+executionTimeoutMs−producedTime. 4) When the task is removed from the work-queue in preparation for execution, only allow execution to proceed if the amount of time remaining is greater than zero.

Accordingly, with this technology, an optimized process for handling large number of customer service interactions to ensure efficient and accurate interaction servicing results is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory.

Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for routing a message to an application over a connection oriented session, the method being implemented by at least one processor in a Kafka messaging platform environment, the method comprising:
    acquiring, by the at least one processor, a plurality of partitions from the Kafka messaging platform;
    designating, by the at least one processor, a first partition from among the plurality of partitions as a sticky partition;
    generating, by the at least one processor, a plurality of routing keys that are configured to route to the sticky partition;
    using, by the at least one processor, a first routing key from among the plurality of routing keys for a first service subscription;
    processing, by the at least one processor, a first application subscription from a first connection oriented session from a first application, and returning the first routing key as a first subscription identifier;
    removing by the at least one processor, the first routing key from plurality of routing keys for a subsequent client subscription; and
    receiving, by the at least one processor, a message transmitted by a second service using the first subscription identifier as a routing key.

2. The method of claim 1, further comprising:
    using a custom Kafka sticky partition assignor to acquire a first plurality of metadata that relates to a sticky partition priority; and
    determining, for each of the first plurality of metadata, a respective highest priority partition for which a corresponding assignment does not change.

3. The method of claim 1, wherein the generating of the plurality of routing keys comprises generating a plurality of random keys; applying a Kafka hash-plus-modulo algorithm to the random keys; and retaining the keys that map to the sticky partition.

4. The method of claim 1, wherein the generating of the plurality of routing keys comprises generating a plurality of random keys; producing the random keys to an inbound topic; and when the keys are consumed, storing keys that are from the sticky partition.

5. The method of claim 1, further comprising:
    associating, by the at least one processor, a first data center identification with a Kafka messaging platform cluster identification and a topic identification;
    caching, by the at least one processor, the first data center identification with the first subscription identifier;
    determining the first data center identification when an event is received; and
    routing the event by using the first subscription identifier and the first data center identification to select a target Kafka cluster based on the associated Kafka messaging platform cluster identification and the associated topic identification.

6. The method of claim 1, further comprising:
    receiving, by the at least one processor, a first event from among a plurality of events, with a time duration for which the first event is valid;
    determining that the time duration for which the first event is valid has been exceeded; and
    dropping the first event.

7. A computing apparatus for routing a message to an application over a connection oriented session, the computing apparatus comprising:
    a processor in a Kafka messaging platform environment;
    a memory; and
    a communication interface coupled to each of the processor and the memory,
    wherein the processor is configured to:
        acquire a plurality of partitions from the Kafka messaging platform;
        designate a first partition from among the plurality of partitions as a sticky partition;
        generate a plurality of routing keys that are configured to route to the sticky partition;
        use a first routing key from among the plurality of routing keys for a first service subscription;
        process a first application subscription from a first connection oriented session from a first application, and return the first routing key as a first subscription identifier;
        remove the first routing key from plurality of routing keys for a subsequent client subscription; and
        receive a message transmitted by a second service using the first subscription identifier as a routing key.

8. The computing apparatus of claim 7, wherein the processor is further configured to:
    use a custom Kafka sticky partition assignor to acquire a first plurality of metadata that relates to a sticky partition priority; and
    determine, for each of the first plurality of metadata, a respective highest priority partition for which a corresponding assignment does not change.

9. The computing apparatus of claim 7, wherein the processor is further configured to generate the plurality of routing keys by generating a plurality of random keys; applying a Kafka hash-plus-modulo algorithm to the random keys; and retaining the keys that map to the sticky partition.

10. The computing apparatus of claim 7, wherein the processor is further configured to generate the plurality of routing keys by generating a plurality of random keys; producing the random keys to an inbound topic; and when the keys are consumed, storing keys that are from the sticky partition.

11. The computing apparatus of claim 7, wherein the processor is further configured to:
    associate a first data center identification with a Kafka messaging platform cluster identification and a topic identification;
    cache the first data center identification with the first subscription identifier;
    determine the first data center identification when an event is received; and
    route the event by using the first subscription identifier and the first data center identification to select a target Kafka cluster based on the associated Kafka messaging platform cluster identification and the associated topic identification.

12. The computing apparatus of claim 7, wherein the processor is further configured to:
receive a first event from among a plurality of events, with a time duration for which the first event is valid;
determine that the time duration for which the first event is valid has been exceeded; and
drop the first event.

13. A non-transitory computer readable storage medium storing instructions for routing a message to an application over a connection oriented session, the storage medium comprising executable code which, when executed by a processor in a Kafka messaging platform environment, causes the processor to:
acquire a plurality of partitions from the Kafka messaging platform;
designate a first partition from among the plurality of partitions as a sticky partition;
generate a plurality of routing keys that are configured to route to the sticky partition;
use a first routing key from among the plurality of routing keys for a first service subscription;
process a first application subscription from a first connection oriented session from a first application, and return the first routing key as a first subscription identifier;
remove the first routing key from plurality of routing keys for a subsequent client subscription; and
receive a message transmitted by a second service using the first subscription identifier as a routing key.

14. The storage medium of claim 13, wherein when executed by the processor, the executable code further causes the processor to:
use a custom Kafka sticky partition assignor to acquire a first plurality of metadata that relates to a sticky partition priority; and
determine, for each of the first plurality of metadata, a respective highest priority partition for which a corresponding assignment does not change.

15. The storage medium of claim 13, wherein when executed by the processor, the executable code further causes the processor to generate the plurality of routing keys by generating a plurality of random keys; applying a Kafka hash-plus-modulo algorithm to the random keys; and retaining the keys that map to the sticky partition.

16. The storage medium of claim 13, wherein when executed by the processor, the executable code further causes the processor to generate the plurality of routing keys by generating a plurality of random keys; producing the random keys to an inbound topic; and when the keys are consumed, storing keys that are from the sticky partition.

17. The storage medium of claim 13, wherein when executed by the processor, the executable code further causes the processor to:
associate a first data center identification with a Kafka messaging platform cluster identification and a topic identification;
cache the first data center identification with the first subscription identifier;
determine the first data center identification when an event is received; and
route the event by using the first subscription identifier and the first data center identification to select a target Kafka cluster based on the associated Kafka messaging platform cluster identification and the associated topic identification.

18. The storage medium of claim 13, wherein when executed by the processor, the executable code further causes the processor to:
receive a first event from among a plurality of events, with a time duration for which the first event is valid;
determine that the time duration for which the first event is valid has been exceeded; and
drop the first event.

* * * * *